US011294817B2

(12) United States Patent
Guirado

(10) Patent No.: US 11,294,817 B2
(45) Date of Patent: Apr. 5, 2022

(54) CONCURRENT CACHE LOOKUPS USING PARTIAL IDENTIFIERS

(71) Applicant: Arm Limited, Cambridge (GB)

(72) Inventor: Antonio Garcia Guirado, Trondheim (NO)

(73) Assignee: Arm Limited, Cambridge (GB)

( * ) Notice: Subject to any disclaimer, the term of this patent is extended or adjusted under 35 U.S.C. 154(b) by 21 days.

(21) Appl. No.: 17/017,001

(22) Filed: Sep. 10, 2020

(65) Prior Publication Data
US 2022/0075730 A1 Mar. 10, 2022

(51) Int. Cl.
*G06F 12/0875* (2016.01)
*G06F 12/0844* (2016.01)
(52) U.S. Cl.
CPC ...... *G06F 12/0875* (2013.01); *G06F 12/0844* (2013.01); *G06F 2212/452* (2013.01)
(58) Field of Classification Search
CPC ... G06F 12/0844–0851; G06F 12/0875; G06F 2212/452
See application file for complete search history.

(56) References Cited

PUBLICATIONS

Mittal, Sparsh. "A survey of architectural techniques for improving cache power efficiency." Sustainable Computing: Informatics and Systems 4.1 (2014): 33-43. (Year: 2014).*

Kwak, Jong Wook, and Young Tae Jeon. "Compressed tag architecture for low-power embedded cache systems." Journal of Systems Architecture 56.9 (2010): 419-428. (Year: 2010).*

Al-Shayeji, Mohammad, Sari Sultan, and Nesreen Mohammad. "Hybrid approach based on partial tag comparison technique and search methods to improve cache performance." IET Computers & Digital Techniques 10.2 (2016): 69-76. (Year: 2016).*

Park, Hyunsun, Sungjoo Yoo, and Sunggu Lee. "A multistep tag comparison method for a low-power L2 cache." IEEE transactions on computer-aided design of integrated circuits and systems 31.4 (2012): 559-572. (Year: 2012).*

* cited by examiner

*Primary Examiner* — Charles Rones
*Assistant Examiner* — Hewy H Li
(74) *Attorney, Agent, or Firm* — Vierra Magen Marcus LLP

(57) ABSTRACT

To perform a lookup for a group of plural portions of data in a cache together, a first part of an identifier for a first one of the portions of data in the group is compared with corresponding first parts of the identifiers for cache lines in the cache, the first part of the identifier for the first one of the portions of data in the group is compared with the corresponding first parts of the identifiers for the remaining portions of data in the group of plural portions of data, and a remaining part of the identifier for each portion of data is compared with the corresponding remaining parts of identifiers for cache lines in the cache. It is then determined whether a cache line for any of the portions of data in the group is present in the cache, based on the results of the comparisons.

21 Claims, 11 Drawing Sheets

CONCURRENT CACHE LOOKUPS USING PARTIAL IDENTIFIERS

BACKGROUND

The technology described herein relates to data processing systems and in particular to cache operations in data processing systems.

Many data processing systems use caches to store data, etc., locally to a processing unit or units so as to reduce the need to fetch data from slower, more power hungry data stores, such as main memory of the data processing system.

In such arrangements, it will first be determined whether the data is available in the appropriate cache. If the data is present in the cache (there is a cache "hit"), then the data will be read from the cache, rather than from the main data store where it is stored, thereby allowing the processing operation to proceed more rapidly.

On the other hand, if the data is not present in the cache (there is a cache "miss"), then the process will operate to first load (fetch) the relevant data into the cache, with the processing operation, e.g., being stalled until the relevant data has been fetched into the cache.

Caches in data processing systems typically comprise a plurality of cache lines, each able to store a respective portion of data. Each cache line will have as part of its "tag" a corresponding "look-up key" that acts as an identifier for (that is used to uniquely identify) the data that is stored in the cache line (i.e. so that the data that is stored in the cache line can be identified). The cache line identifier may, for example, be (part of) a memory address where the data that is in the cache line is stored, or may identify the data in another way, for example being all or part of an index for the data, and/or of a position within a data array that the data corresponds to, etc. Other cache line identifier arrangements are, of course, possible.

(As well as an identifier, the tag for a cache line may include other information, such as a valid bit, replacement information, etc.)

In order to determine whether required data is stored in a cache, an appropriate cache "lookup" operation will be performed, that compares the appropriate identifier for the requested data with the identifiers for the cache lines in the cache, to determine whether a cache line for the required data is already present in the cache or not.

Correspondingly, when new data is to be loaded into the cache (known as a line fill) (e.g. following a cache "miss"), the identifier for the cache line where the new data will be stored is set to the appropriate identifier for that data.

The Applicants believe that there remains scope for improvements to cache operations in data processing systems.

BRIEF DESCRIPTION OF THE DRAWINGS

An embodiment of the technology described herein will now be described by way of example only and with reference to the accompanying drawings, in which.

Like reference numerals are used for like components where appropriate in the drawings.

DETAILED DESCRIPTION

Figure 1:
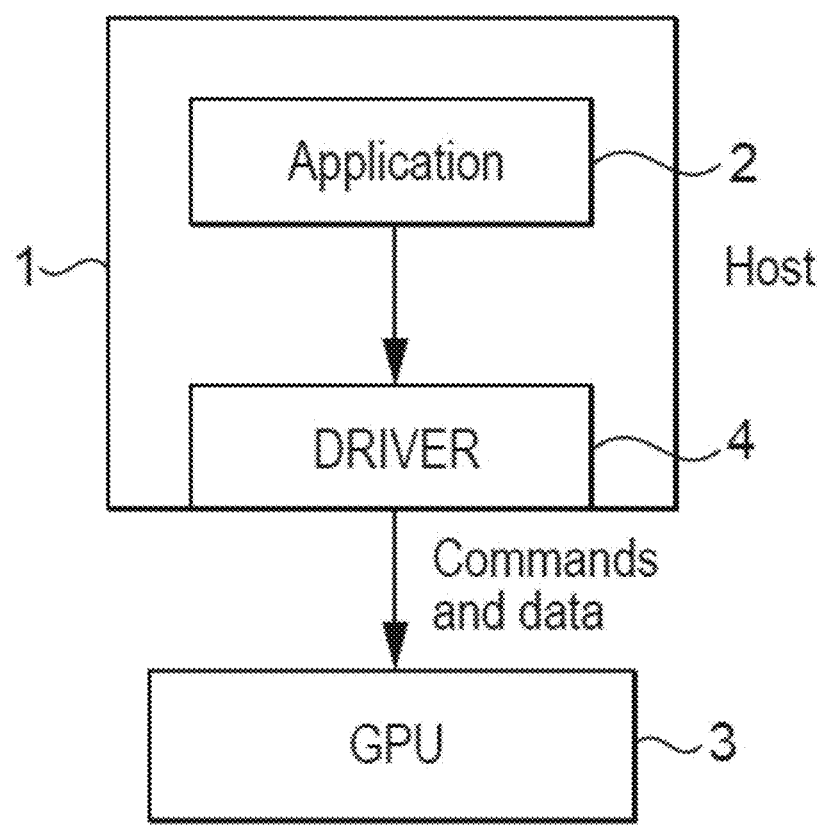
FIG. 1 shows an exemplary graphics processing system.

A first embodiment of the technology described herein comprises a method of determining whether data is present in a cache in a data processing system, the cache comprising a plurality of cache lines, each configured to store a portion of data, and each cache line having associated with it an identifier for identifying the data stored in the cache line; the method comprising:

for a group of plural portions of data that will be stored in different cache lines in the cache, each portion of data having an identifier for the portion of data that will match the identifier for a cache line that is storing that portion of data:

comparing a first part of the identifier for a first one of the portions of data in the group with corresponding first parts of the identifiers for cache lines in the cache, to determine whether the first part of the identifier for the first portion of data matches the corresponding first part of an identifier for any cache lines in the cache;

comparing the first part of the identifier for the first one of the portions of data in the group with the corresponding first parts of the identifiers for the remaining portions of data in the group of plural portions of data to determine whether the first part of the identifier for the first one of the portions of data in the group matches the corresponding first part of the identifier for any of the remaining portions of data in the group;

at least when the first part of the identifier for the first one of the portions of data in the group matches the corresponding first part of an identifier for any cache lines in the cache, for at least the first portion of data in the group, and any remaining portion of data in the group whose first part of the identifier matches the first part of the identifier for the first one of the portions of data in the group, comparing a remaining part of the identifier for the portion of data with the corresponding remaining parts of identifiers for cache lines in the cache, to determine whether the remaining part of the identifier for the portion of data matches the corresponding remaining part of an identifier for a cache line in the cache; and determining whether a cache line for any of the portions of data in the group is present in the cache, based on the results of the comparisons.

A second embodiment of the technology described herein comprises a cache system for a data processor, the cache system comprising:

a cache comprising a plurality of cache lines, each cache line configured to store a portion of data, and each cache line having associated with it an identifier for identifying the data stored in the cache line; and a cache control circuit configured to:

for a group of plural portions of data that will be stored in different cache lines in the cache, each portion of data having an identifier for the portion of data that will match the identifier for a cache line that is storing that portion of data:

compare a first part of the identifier for a first one of the portions of data in the group with corresponding first parts of the identifiers for cache lines in the cache, to determine whether the first part of the identifier for the first portion of data matches the corresponding first part of an identifier for any cache lines in the cache;

compare the first part of the identifier for the first one of the portions of data in the group with the corresponding first parts of the identifiers for the remaining portions of data in the group of plural portions of data to determine whether the first part of the identifier for the first one of the portions of data in the group matches the corresponding first part of the identifier for any of the remaining portions of data in the group;

at least when the first part of the identifier for the first one of the portions of data in the group matches the corresponding first part of an identifier for any cache lines in the cache, for at least the first portion of data in the group, and any remaining portion of data in the group whose first part of the identifier matches the first part of the identifier for the first one of the portions of data in the group, compare a remaining part of the identifier for the portion of data with the corresponding remaining parts of identifiers for cache lines in the cache, to determine whether the remaining part of the identifier for the portion of data matches the corresponding remaining part of an identifier for a cache line in the cache; and determine whether a cache line for any of the portions of data in the group is present in the cache, based on the results of the comparisons.

The technology described herein relates to cache operations in data processing systems, and in particular to a cache arrangement in which plural cache "lookups" (i.e. for plural portions of data) can be and are performed together (and in an embodiment in the same cycle). The Applicants have recognised in this regard that there can be circumstances in which it is desirable to be able to perform more than one lookup in a cache together, e.g., and in an embodiment, per cycle (and correspondingly to be able to handle more than one cache "miss" together, e.g. per cycle). For example, in the case of graphics processing at least, this may be the case in the vertex cache (e.g. in the tiler in a tile-based graphics processing system), and/or in the texture cache and the L1 cache in the texture mapper.

As will be discussed in more detail below, the technology described herein can provide arrangements and a cache system in which plural cache lookups can be and are performed together, but with relatively little increased silicon area cost as compared, for example, to a cache that supports only a single lookup at a time.

To achieve this, in the technology described herein, the cache line identifier comparisons for plural cache lookups that are being performed together are performed in two parts.

In particular, for a group of plural portions of data that are being looked up in the cache together, a single cache line tag identifier comparison is performed for all the portions of data in common for a first part of the identifiers for the data, but separate, and respective, cache line tag identifier comparisons are performed for the remaining parts of the identifiers for the portions of data that are being looked up together.

This accordingly reduces the amount and extent of the cache line tag identifier comparisons that need to be made, even when performing multiple lookups into the cache in the same cycle, and, as will be discussed further below, accordingly facilitates performing multiple lookups to a cache together with significantly lower area and other cost as compared, for example, to arrangements in which a separate and "full" cache tag identifier comparison is performed for each separate portion of data that is being looked up at the same time.

The Applicants have recognised in this regard that at least for certain data that is being cached, it may be likely that data that it would be desirable to fetch from the cache at the same or a similar time will have at least part of their respective identifiers (that are used for the corresponding cache line tags) in common.

For example, the Applicants have recognised that in the case of the vertices in a vertex cache in a graphics processor, which are correspondingly tagged in the cache using the respective vertex indices, it may be likely that plural vertices whose data needs to be looked up one after the other will have similar indices (e.g. because they may, e.g., be consecutive, or at least close together, vertices) (as it is likely that cache accesses will have high temporal and spatial locality). Similarly in the case of cache line tags comprising memory addresses, and, e.g., there is spatial locality between the data that needs to be operated on, it may be quite likely that the data that is required for successive lookups will be stored at (and thus tagged with) similar memory addresses. Equally, in the case of a texture cache, the texture coordinates required for texture data that is needed at the same or a similar time are again likely to be similar to each other.

Thus the Applicants have recognised that when performing cache lookups, at least in certain situations, it may be likely that a part of the tags (namely the identifiers) for plural cache lookups that it is desirable to perform at the same time will be the same.

The technology described herein exploits this by performing a single (and shared) tag identifier comparison for the parts of the identifier (e.g. of the vertex indices) that might be expected to be the same for the plural lookups, and then separate comparisons for those parts of the identifiers that might be expected to be different. As will be discussed further below, this then facilitates performing plural lookups into the cache together, but using a reduced number of tag identifier comparisons, as compared, for example, to arrangements in which each separate lookup uses an independent full and complete tag identifier comparison (i.e. by simply duplicating in full the operation for a single cache line identifier comparison for each additional cache line identifier comparison that it is desired to perform together).

The technology described herein may be particularly useful for highly associative caches, such as set-associative and fully associative caches Subject to the requirements for operation in the manner of the technology described herein (which will be discussed in more detail below), the cache in the technology described herein can be configured in any suitable and desired manner, such as, and in an embodiment, in accordance with the cache requirements and configuration otherwise needed and used in the data processor and data processing system in question.

The cache can contain any suitable and desired number of cache lines, such as 512 cache lines, and each cache line can have any suitable and desired capacity for storing data (store any desired "amount" of data). The cache is in an embodiment associative, e.g. fully associative or set associative.

As discussed above, each cache line will be tagged with an appropriate identifier (look-up key) that can be used to indicate and identify the data that is stored in the cache line.

The identifiers can identify and represent the data that is stored in the cache lines in any suitable and desired manner. The identifiers may comprise a single parameter (field) or they may comprise a combination of plural parameters (fields), e.g. in dependence upon how the data in questions is identified.

In one embodiment, the identifiers comprise all or part of indices for the data in question. This could be, and is in an embodiment, the case where the cache is for a graphics processor and in a graphics processing system, and stores vertex data, in which case each cache line identifier in an embodiment comprises a vertex index identifying a vertex that data in the cache line corresponds to.

In another embodiment, the identifiers comprise all or part of memory addresses for the data in question (i.e. all or part of a memory address where data that is stored in the cache line is stored).

In another embodiment, the identifiers comprise all or part of "positions" for the data in question, e.g., and in an embodiment within a data array that the data in question belongs to. For example, and in an embodiment, in the case where the cache stores texture data for use by a graphics processor, the identifier for a cache line may, and in an embodiment does, comprise, at least in part, the texture coordinates of a texel or texels that the data in the cache line corresponds to.

The identifiers could also comprise a combination (e.g. a concatenation) of more than one parameter (field) if desired. For example, in the case of a texture cache for a graphics processor, the identifiers could comprise a concatenation of a descriptor address and texture coordinates and/or other texture parameters, such as the texture ID, surface ID and texel format together with the texture coordinates.

Other forms of identifier would, of course, be possible.

As well as the identifiers and the data itself, each cache line in the cache (each cache line tag) may also have other information stored for it and associated with it as desired.

In an embodiment, each cache line has an associated identifier (e.g. index) for the cache line in the cache, that can be used to identify the cache line in the cache. (This cache line index will identify the cache line in the cache, rather than the data that is stored in the cache line (which is what the cache line identifier does).)

Each cache line in the cache may also or instead (and in an embodiment also) have other information stored for it and associated with it, if desired. For example, each cache line in the cache (each cache line tag) may have one or more of, in an embodiment all of: a "valid" indicator (flag) indicating that the cache line is in use and stores valid data; a "dirty" indicator (flag) that indicates that the data in the cache line has been modified since it was loaded from the memory system; and a "reference count" that tracks whether the data in the cache line is still needed or not (can be evicted or not). Each cache line in the cache (each cache line tag) may also have, for example, replacement state information, cache coherency state information (for example, MESI (modified, exclusive, shared, invalid) protocol information) and, for lower level caches at least, cache directory information.

The cache will store data fetched from a main memory system of the overall data processing system for use by a data processor (a processing unit of a data processor) that requires that data. Thus, the cache will be part of a cache system arranged between a memory system of the overall data processing system, and the data processor/processing unit in question, and be operable to transfer data stored in the memory system to the data processor/processing unit, and/or data generated by the data processor/processing unit to the memory system. In this regard, there may be multiple cache levels (a cache hierarchy) between the memory system and the data processor/processing unit, and the operation in the manner of the technology described herein may be applied to any one or more or all of the different caches (cache levels) within the cache hierarchy, as desired and as appropriate.

The data processor and processing unit that uses the data from the cache (and accordingly for which the cache lookups are being performed) can be any suitable and desired data processor and processing unit.

In an embodiment, the data processor is a graphics processor (a graphics processing unit). In this case, in one embodiment the cache is a vertex cache of the data processor (i.e. that caches vertex data for use by the graphics processor), and in an embodiment a vertex cache that caches vertex data for use by a tiler (a tiling circuit) of a tile-based graphics processor (thus the processing unit will be a tiler of the graphics processor). In another embodiment in the context of a graphics processor, the cache is a texture cache for the graphics processor that provides texture data to a texture mapper (a texture mapping circuit) of the graphics processor, and/or the cache is the L1 cache in a texture mapper (a texture mapping circuit) of the graphics processor.

The memory (memory system) of the data processing system that the data is loaded from into the cache (and that the cache and cache system interfaces with) may comprise any suitable and desired memory and memory system of the overall data processing system, such as, and in an embodiment, a main memory for the data processor in question (e.g. where there is a separate memory system for the data processor), or a main memory of the data processing system that is shared with other elements, such as a host processor (CPU), of the data processing system.

Subject to the particular features required for the technology described herein that are discussed herein, the cache can otherwise be configured and operate in any suitable and desired manner, such as, and in an embodiment, in dependence on and according to the normal cache mechanisms and operations for the data processing system in question.

Thus the cache operation may, for example, and in an embodiment, otherwise use the normal cache operations and processes as would otherwise be used in the data processing system in question.

In the technology described herein, plural cache lookups are performed together. The plural cache lookups that are performed together (the lookup operations for the plural portions of data in the group that are being looked up together) should be, and are in an embodiment, performed in parallel (simultaneously) (rather than one after another). The plural cache lookups may be performed in parallel (simultaneously) over multiple cycles of operation (e.g. where a given lookup takes multiple cycles), or in the same (single) cycle of operation (e.g. where the cache supports that). Thus, in general the plural cache lookups that are being performed together will be all be performed simultaneously, in the same single cycle, or over (and in) the same set of plural cycles.

The plural cache lookups that are performed together may be across the entire cache, or only a subset of the cache lines of the cache, as desired, and as appropriate. For example, in the case of a set-associative cache, the plural lookups may be within a single set of the cache only, or across some but not all of the sets, or across all the sets, as desired.

The (plural) number of cache lookups that are performed together can be selected as desired. This may depend, e.g., upon how likely it is expected that a given number of cache lookups will have parts of their cache line identifiers in common (as that will then affect how often the operation in the manner of the technology described herein actually allows plural cache lookups to be able to be usefully performed together) (since the more lookups that are being performed in parallel, the less likely it may be that all of the lookups being performed in parallel will share part of their identifiers).

In an embodiment, the (plural) number of lookups that are performed together comprises 2n lookups, where n is an integer greater than 0. In an embodiment either two, four or eight lookups are performed together (in parallel), e.g. in the same cycle. In an embodiment, two lookups are performed together (and in an embodiment in the same cycle). Thus the group of plural portions of data that are being looked up together will comprise, e.g., 2, 4 or 8, and in an embodiment 2, portions of data.

While it would be possible, for example, to have different numbers of portions of data in different groups of plural portions of data that are being looked up together in the cache, in an embodiment, the cache operation and the cache control circuit is configured to always perform lookups for groups comprising the same number of portions of data together, e.g. in a given cycle of operation. Thus, the cache control circuit will be configured to (and the cache operation will) perform lookups for plural (different) groups of plural portions of data, e.g. one group after another, with each group of plural portions of data that are looked up together (simultaneously) comprising the same number of portions of data (at least for operation in respect of a given, particular cache).

Each portion of data that is in the group of plural portions of data that is being looked up together, e.g. in the same cycle of operation will, as discussed above, have an identifier for the portion of data that will correspond to and match the identifier that will be used for a cache line that stores that portion of data. Thus, it can be determined whether there is a cache line in the cache for the portion of data in question by comparing the identifier for the portion of data to the identifiers for the cache lines in the cache, to determine if the identifier for the portion of data matches the identifier (in the tag) of any cache line in the cache.

It should be noted in this regard that if the identifiers match (there is a cache "hit"), that indicates that a cache line in the cache has been allocated for the portion of data in question. It could in that case be that the allocated cache line for the portion of data already stores the data (i.e. the data has already been fetched from the memory and stored in the cache line), or it could be that the cache line has been allocated for storing the portion of data, but the data has still to arrive in the cache from the memory. The operation in the manner of the technology described herein may, and in an embodiment does, therefore also comprise checking to determine whether the portion of data is already stored in the cache line, or it is necessary to wait for the data to arrive in the cache line. Equally, an appropriate reference count for the cache line may be incremented, to indicate that the portion of data in the cache line is required for use (and (ideally) shouldn't be selected for eviction).

In the technology described herein, the identifiers for the portions of data in the group of plural portions of data are divided into, and handled as, two parts for the purposes of the cache line tag identifier comparisons. In particular, one set of comparisons is performed for a first part of the identifiers, and a second, different set of comparisons is done for the remaining parts of each identifier.

In particular, the first part of the identifier for (a first) one of the portions of data in the group is compared to the identifiers for the cache lines in the cache, to determine whether that first part of the identifier for the "first" portion of data matches the corresponding first part of the identifier for any cache lines in the cache. (It will be appreciated in this regard that because only a first part of the identifier is being compared to the cache line identifiers, that first part of that identifier could match to plural cache lines in the cache.)

Thus, a single cache line identifier comparison is performed for the first part of the identifier for (only) one of the portions of data that are being looked up together (in the cycle in question).

This comparison of the first part of the identifier for one of the portions of data in the group to the identifiers for the cache lines in the cache should, and in an embodiment does, compare the first part of the identifier for that first portion of data in the group to the identifiers for all the cache lines in the cache.

In addition to this, the first part of the identifier for the portion of data for which the comparison to the identifiers for the cache lines in the cache was made, is also compared to the first part of each identifier for all of the remaining portions of data in the group of plural portions of data. This then determines whether any of the remaining portions of data in the group of plural portions of data has the same first part of the identifier as the (first) portion of data in the group of plural portions of data whose first part of the identifier has been compared to the identifiers for the cache lines in the cache.

The effect of this then is that a single cache line identifier comparison is used to identify all those cache lines in the cache that are (potentially) allocated to any portion of data in the group of plural portions of data that has the same first part of its identifier as the first one of the portions of data in the group whose first part of its identifier is compared to the identifiers for the cache lines in the cache.

Thus the first parts of the identifiers for the portions of data in the group of plural portions of data are, in effect, compared to the identifiers for the cache lines in common (and once) for all the portions of data in the group of plural portions of data that is being looked up.

(It should be noted here that the references herein to a "first one" of the portions of data in the group of plural portions of data is simply intended to identify the (only) portion of data in the group for which the first part of the identifier is compared to the cache line identifiers, and is not intended to otherwise require that that portion of data has any particular position (e.g. is the initial portion of data) within the overall group of plural portions of data. Thus the "first one" of the portions of data in the group plural portions of data can be any portion of data from the group of plural portions of data, although in an embodiment it is the initial portion of data in the group of plural portions of data.)

In addition to the comparisons for the first part of the identifiers, a comparison of the remaining part of the identifier to the corresponding parts of the identifiers for cache lines in the cache is performed separately for portions of data in the group of plural portions of data that is being looked up together.

This separate comparison of the remaining parts of the identifiers could be conditional upon the results of the comparison of the first parts of the identifiers, i.e. such that only those portions of data in the group of plural portions of data whose first part of the identifier matched the identifier for a cache line in the cache then have their remaining parts of their identifiers subjected to a separate cache line comparison for those remaining parts of the identifiers.

However, in an embodiment, the remaining parts of the identifiers for the portions of data in the group of plural portions of data are compared appropriately to the identifiers for the cache lines in the cache irrespective of whether it has been determined that the first part of the identifier for the portion of data in question matches to a cache line in the cache.

Similarly, while it would be possible, if desired, to only compare the remaining parts of the identifiers for the (appropriate or all) portions of data in the group of plural portions of data to cache lines that it has already been determined match the first part of the identifier, in an embodiment the remaining parts of the identifiers for the portions of data in the group of plural portions of data are simply compared to the identifiers for all the cache lines in the cache, so as to determine whether there is any cache line in the cache that matches to the remaining part of the identifier for the portion of data in question.

Thus, in an embodiment, the method of the technology described herein comprises (and the cache control circuit is correspondingly configured to), for all of the portions of data in the group, comparing a remaining part of the identifier for the portion of data with the corresponding remaining parts of identifiers for (all the) cache lines in the cache to determine whether the remaining part of the identifier for the portion of data matches the corresponding remaining part of an identifier for a cache line in the cache.

Thus in an embodiment, there is a single, common comparison with the cache line identifiers for the first part of the identifier for one of the portions of data in the group of plural portions of data, but then a separate cache line identifier comparison is performed for the remaining part of the identifier for each portion of data in the group of plural portions of data.

The first parts of the identifiers for the portions of data in the group of plural portions of data that are compared, and one of which is compared to the identifiers for cache lines in the cache, can be any suitable and desired part of the identifiers for the portions of data.

It should be noted in this regard, that the "first part" of the identifiers, and references to the first parts of the identifiers used herein, are simply intended to refer to the part of the identifiers that is compared once and in common to the cache line identifiers, and does not require or imply that that "first" part of the identifier that is compared in common has to be the initial part of the identifiers (or otherwise constrain the position of that commonly compared part of the identifiers within the overall identifiers).

The first part of an identifier for a portion of data in the operation in the manner of the technology described herein will thus comprise some but not all of the identifier, and may, e.g., and in an embodiment, comprise some but not all of the sequence of bits that is stored for (that represents) the identifier. (Each cache identifier (tag) (and correspondingly the identifiers for the portions of data) will comprise an appropriate sequence of bits representing and corresponding to the identifier in question.)

The first parts of the identifiers that are considered in the manner of the technology described herein will be the same part of each identifier for each portion of data in the group of plural portions of data. Thus, for example, and in an embodiment, the same particular set of positions (e.g. bits) from the identifier for a portion of data within the group of plural portions of data will be taken and treated as the first part of the identifier for the purposes of the operation in the manner of the technology described herein.

While it would be possible to vary the first parts of the identifiers for respective different groups of plural portions of data that are to be looked up in the same cycle, in an embodiment, at least for operation in respect of a given, particular cache, the first parts of the identifiers that are used are the same (fixed) for all lookups in the manner of the technology described herein into the cache in question.

The corresponding first parts of the identifiers for the portions of data in the group of plural portions of data can comprise any suitable and desired part of each identifier. In an embodiment the first part of an identifier comprises some but not all of the sequence of bits for the identifier, such as, and in an embodiment, the bits from particular, in an embodiment selected, in an embodiment predetermined, bit positions in the identifier.

The first parts of the identifiers may comprise any suitable and desired sets of some but not all of the bits (the bit positions) from the identifiers. In one embodiment the first parts of the identifiers comprise a set of bits (bit positions) from the identifiers, such as, and in an embodiment, a particular, in an embodiment selected, in an embodiment predetermined, number of the most significant bits (MSBs) of the identifiers. In this case, the selected number of the MSBs of the identifiers may, and in an embodiment do, comprise a contiguous set of bits (bit positions) from the identifiers, but that need not be the case, and for example where the relevant identifier stored in the tag is scrambled, the selected set of the MSBs of the identifiers may not in fact comprise a contiguous set of bits (bit positions) from the identifiers.

Correspondingly, in one embodiment the first parts of the identifiers comprise a contiguous set of bits (bit positions) from the identifiers, and in another embodiment, the first parts of the identifiers comprise a non-contiguous set of bits (bit positions) from the identifiers.

In this case, the number of most significant bits that are used for the first parts of the identifiers that are, in effect, compared in common to the cache line tags, can be selected as desired. For example, they may be some particular proportion, such as 75%, of the most significant bits of the identifiers. For example, in the case of 32-bit identifiers, in an embodiment the first parts of the identifiers for the purposes of the technology described herein comprise the first 27 most significant bits of the identifiers. In general, the temporal and spatial locality of the data may determine the portion of the identifier that is shared and the portions that will be unique, and so the relative sizes of the first and second parts of the identifiers can be selected on that basis.

The Applicants have recognised that using a particular number of the most significant bits from the identifiers as the first parts of the identifiers for the purposes of the technology described herein will be particularly applicable in the case where the identifiers are indices for data elements that the corresponding data that is to be stored in the cache line is for (as in that case it may be expected that the most significant bits of the indices that are being looked up will be the same), and/or in the case where the data in the cache is identified using memory addresses (i.e. the memory address where the data has come from) (as again in that case it might be expected that the most significant bits of the memory addresses for data that is required at the same time (e.g. if it has spatial locality) would be expected to be the same).

Thus in one embodiment, the portions of data are identified using indices for data elements that the portions of data relate to, and the first parts of the identifiers for the portions of data comprise a particular, in an embodiment selected, in an embodiment predetermined, number of the most significant bits of the indices that are used as the identifiers for the portions of data. This will be the case, for example, in a vertex cache in graphics processing, where the data in the cache is identified in terms of an index of a vertex to which the data relates. Thus, in this case, a set of MSBs from each vertex index that is being looked up would be used as the first parts of the identifiers.

In another embodiment, the portions of data are identified using memory addresses for the portions of data, and the first parts of the identifiers for the portions of data comprise a particular, in an embodiment selected, in an embodiment predetermined, number of the most significant bits of the memory addresses that are used as the identifiers for the portions of data. This will be the case, for example, in a general purpose cache where the data in the cache is identified in terms of the memory address where the data is stored, an instruction cache, a data cache in a CPU (or any other processor), or a data cache in the execution engine of a GPU (or any other processor), etc. Thus, in this case, a set of MSBs from each memory address that is being looked up would be used as the first parts of the identifiers.

It would also be possible for the first parts of the identifiers that are considered in the technology described herein to be other than simply a set of the most significant bits of the identifiers, if desired. In other words, the first parts of the identifiers could comprise a set of bits and bit positions from the identifiers that are not all contiguous with each other. For example, where the identifiers are made up of a number of different parameters (fields), the first parts of the identifiers could comprise some but not all of the different parameters (fields) of the identifiers, and/or, e.g., and in an embodiment, a selection of some of the most significant bits from two or more or all of the parameters that make up the overall identifier (as it may again be expected to be more likely that the most significant bits of the parameters will be the same for data that is required at the same time).

This could be the case, for example, where the cache is a texture cache in a graphics processing system, that is tagged using both an identifier or identifiers for the texture that the texels in the cache line come from and a position for the texel or texels in the texture in question. In this case, the part of the identifiers that is used for the first part of the identifiers for the purposes of the operation in the manner of the technology described herein could comprise, for example, the appropriate parameters identifying the texture in question (such as the texture ID and the surface ID), together with some or all of, and in an embodiment a set of the most significant bits of, the position (the position coordinates) for the texels that the cache line stores. In this case, a set of the most significant bits of each texture coordinate could be used for the first part of the identifier, with the remaining, e.g., and in an embodiment, least significant bits, from each texture coordinate forming the remaining part of the identifier for the purposes of the comparisons in the manner of the technology described herein.

Other arrangements would, of course, be possible, e.g. depending upon the nature of the data that is being stored in the cache, and how that data is identified (tagged) in the cache.

The remaining part of the identifier for a portion of data that is subject to its own, separate, comparison with the identifiers for the cache lines in the cache will correspondingly comprise the remaining part (and in an embodiment all of the remaining part) of the identifier that is not part of the first part of the identifier. Thus the remaining part of the identifier for a portion of data will comprise those bits (bit positions) of the identifier that are not included in the first part of the identifier. Thus, in the case where the first part of the identifier comprises a particular set of the most significant bits of the identifier, the remaining part of the identifier will comprise the remaining, least significant bits of the identifier (that are not in the first part of the identifier).

In the technology described herein, in order to determine whether a cache line for any of the portions of data in the group of plural portions of data is present in the cache, three respective different comparisons are performed using the first parts and the remaining parts of the identifiers for the portions of data in the group. Thus the cache control circuit will correspondingly comprise an appropriate comparison circuit or circuits to perform these comparisons.

All of the comparisons should be, and are in an embodiment, performed together, and in an embodiment simultaneously (in the same cycle or cycles of operation), so as to allow the "lookups" for the portions of data in the group of plural portions of data to be performed together.

The different comparisons could be performed one after the other, in any desired sequence, or some or all of them could be performed in parallel.

Correspondingly, some or all of the comparisons could be conditional on one or more others of the comparisons, for example such that the remaining parts of the identifiers are only compared if the first part of an identifier matches at least one cache line.

However, as discussed above, in an embodiment, all of the comparisons are performed irrespective of the results of any of the other comparisons (i.e. the performance of the different comparisons is not conditional on the result of another comparison). Correspondingly, in an embodiment, all of the comparisons are performed in parallel.

Thus, in an embodiment, the cache control circuit comprises a (first) comparison circuit that is operable to compare a first part of the identifier for one of the portions of data in a group of plural portions of data with the corresponding first parts of the identifiers for all the cache lines in the cache, a (second) comparison circuit that is operable to compare the first part of the identifier for the (first) one of the portions of data in the group with the corresponding first parts of the identifiers for the remaining portions of data in the group, and a (third) comparison circuit that is operable to compare for each of the portions of data in the group, the remaining part of the identifier for that portion of data with the corresponding remaining parts of identifiers for all the cache lines in the cache.

The results of the comparisons can be used to determine whether a cache line for any of the portions of data in the group is present in the cache in any suitable and desired manner.

In an embodiment, the result of the comparisons can be one or more of: a determination that a cache line for one or more of the portions of data in the group is present in the cache (i.e. there is a cache hit for one or more of the portions of data in the group); that a lookup for one or more of the portions of data in the cache was performed, but a cache line for the portion or portions of data was not present in the cache (i.e. there was a cache "miss" for one or more of the portions of data); and that a lookup for one or more of the portions of data was not performed.

Correspondingly, in an embodiment, the result of the comparisons for a given portion of data can be one of one or more of, and in an embodiment one of all of: a determination that a cache line for the portion of data is present in the cache (i.e. there is a cache hit for the portion of data); that a lookup for the portion of data in the cache was performed but a cache line for the portion of data was not present in the cache (i.e. there was a cache miss for the portion of data); and that a lookup for the portion of data was not performed.

As will be discussed in more detail below, in the case where there is a "hit" for a portion of data, an appropriate "hit" operation is in an embodiment performed. In an embodiment, this is to return the line index (identifier) for the cache line in the cache that is storing the portion of data, such that the data processor (processing unit) can then use the data from the cache. (The data processor (processing unit) will in an embodiment then retrieve the data from the cache line and perform a, e.g. processing, operation, using the data.

In the case where there is a "miss" for one or more portions of data, then an appropriate "miss" handling operation is in an embodiment performed in that event. This will be discussed in more detail below.

In the case where a lookup for the portion of data was not performed, then the lookup for the portion of data will be indicated to be, and caused to be, tried again, in another (e.g. the next) cycle.

The comparisons are in an embodiment used as follows to determine whether a cache line for any of the portions of data in the group is present in the cache, and how to proceed in response to the results of the comparisons.

Firstly, when it is determined that the first part of the identifier for the first one of the portions of data in the group does not match the corresponding first part of an identifier for any cache lines in the cache, then that is considered to be a "miss" for that first one of the portions of data in the group, and so an appropriate "miss" handling operation is performed for the first one of the portions of data in the group.

When the first part of the identifier for the first one of the portions of data in the group matches the corresponding first part of an identifier for at least one cache line in the cache, it is also considered whether the comparison of the remaining part of the identifier for that first portion of data matched to the corresponding remaining part of an identifier for a cache line in the cache that the first part of the identifier also matched to.

When both the first part and the remaining part of the identifier for the first one of the portions of data in the group match to the same cache line, then that is taken as a cache "hit", and an appropriate "hit" operation is performed (which as discussed above is in an embodiment to return the line index (identifier) for the cache line in the cache that is storing the portion of data).

On the other hand, when the remaining part of the identifier for the first one of the portions of data in the group does not match to the remaining part of the identifier for any of the cache lines in the cache, or matches to the remaining part of the identifier for one or more cache lines in the cache, but not to a cache line in the cache for which the first part of the identifier also matches, then that is treated as a "miss" in the cache for the first one of the portions of data, and so the appropriate miss handling operation for the first one of the portions of data in the group is performed.

The comparison of the first part of the identifier for the first one of the portions of data in the group with the corresponding first parts of the identifiers for the remaining portions of data in the group in effect determines whether the first parts of any of the identifiers for the remaining portions of data in the group match the first part of the identifier for the first portion of data in the group (i.e. the first part of the identifier that is compared to the identifiers for the cache lines in the cache (to the cache line tags)). This will accordingly determine whether there are any other portions of data in the group that have a matching first part of the identifier to the first portion of data whose first part of its identifier has been compared to the cache lines. This will accordingly determine whether any of the cache lines that matched to the first part of the identifier for the first one of the portions of data in the group could also or instead match to the identifier for a remaining portion or portions of data in the group.

When the comparison of the first part of the identifier for the first one of the portions of data in the group that has been compared to the cache line tags to the first parts of the identifiers for the remaining portions of data in the group determines that first part of the identifier for a remaining portion of data in the group does not match to the first part of the identifier for the first one of the portions of data in the group, then it is determined that a lookup into the cache for that remaining portion of data that did not match was not performed in the cycle of operation in question. (This is on the basis that because the lookup that was performed effectively uses the first part of the identifier for the first one of the portions of data in the group, for any portion of data that does not share that first part of the identifier, the lookup for that first part of the identifier would not act as a lookup for that remaining portion of data.) In this case therefore, it is in an embodiment set so that the remaining portion of data in question is looked up again (retried) in another (e.g. and in an embodiment the next), cycle of operation.

In the case where some but not all of the remaining portions of data matched the first part of the identifier for the first one of the portions of data in the group, then in an embodiment (all of) the remaining portions of data that did not match are retried in another, e.g. the next, cycle, in an embodiment together with one or more new, incoming, lookups (where the arrangement has the capacity for that). Thus, for example, in the case where 4 lookups are performed together, and 2 of them matched and 2 did not match, the 2 lookups that did not match will be retried in the, e.g. next, cycle, in an embodiment together with 2 new incoming lookups.

On the other hand, when the first part of the identifier for a remaining portion of data in the group does match the first part of the identifier for the first one of the portions of data in the group that is compared to the cache line tags, then the result of the comparison of the first part of the identifier for the first one of the portions of data in the group to the corresponding first parts of the identifiers for the cache lines in the cache is considered to determine the result of the lookup for the (and any) remaining portions of data in the group whose first part of the identifier matched the first part of the identifier for the first one of the portions of data in the group that is compared to the cache line tags.

In this case, when it is determined that the first part of the identifier for the first one of the portions of data in the group does not match the corresponding first part of an identifier for any cache lines in the cache (i.e. such that there is a "miss" for that first one of the portions of data in the group), then it is in an embodiment correspondingly determined that there was a "miss" for any and all of the remaining portions of data in the group whose first part of the identifier matched the first part of the identifier for the first one of the portions of data in the group that is compared to the cache line tags (this is on the basis that it can accordingly be known that those lookups will also miss in the cache), and so an appropriate "miss" handling operation is performed for those remaining portions of data in the group.

On the other hand, when it is determined that the first part of the identifier for the first one of the portions of data in the group does match the corresponding first part of an identifier for any cache lines in the cache (i.e. such that there is potentially a "hit" in the cache), then for a (and each) of the remaining portions of data in the group whose first part of the identifier matched the first part of the identifier for the first one of the portions of data in the group, the corresponding comparisons of the remaining parts of the remaining portions of data in the group are in an embodiment also considered to determine whether there is a hit or a miss in the cache for that remaining portion of data.

When the remaining part of the identifier for a remaining one of the portions of data in the group matches to a cache line that the first part of the identifier for the first one of the portions of data in the group match also matched, then that is taken as a cache "hit" for that remaining portion of data, and the appropriate "hit" operation is performed.

On the other hand, when the remaining part of the identifier for a remaining one of the portions of data in the group does not match to the remaining part of the identifier for any of the cache lines in the cache, or matches to the remaining part of the identifier for one or more cache lines in the cache, but not to a cache line in the cache for which the first part of the identifier for the first one of the portions of data in the group also matched, then that is treated as a "miss" in the cache for the remaining portion of data in question, and so the appropriate miss handling operation for the remaining portion of data is performed.

The results of the comparisons can be considered and combined in any desired order (sequence) to determine whether there is a hit or a miss for a portion of data in the above manner.

In an embodiment, the comparison of the first part of the identifier for the first one of the portions of data in the group to the first parts of the identifiers for the cache lines is considered first, and if that first part of the identifier is determined not to match the first part of the identifier for any cache lines in the cache, then a miss handling operation is performed (as discussed above).

On the other hand, if the first part of the identifier for the first one of the portions of data matches to at least one cache line identifier, then the comparison for the remaining part of the identifier for the first one of the portions of data in the group is considered, to identify whether there is a cache line present in the cache for that first portion of data in the group or not.

The comparison of the first part of the identifier for the first one of the portions of data in the group with the corresponding first parts of the identifiers for the remaining portions of data in the group is in an embodiment then considered, to identify whether any of the remaining portions of data in the group need to be considered further.

When there is no other portion of data in the group whose first part of the identifier matches the first part of the identifier for the first one of the portions of data in the group, then the comparisons will not be able to determine whether there are cache lines for any of the remaining portions of data in the group present in the cache (i.e., in effect, the comparisons cannot perform a lookup for those portions of data), and so it can be determined that the remaining portions of data in the group should be retried in another cycle.

On the other hand, when the first part of the identifier for at least one of the remaining portions of data in the group matches the first part of the identifier for the first one of the portions of data in the group, the comparison of the remaining part of the identifier for that remaining portion of data in the group is also considered, to determine whether there is a cache line that matches both the first part of the identifier for the first one of the portions of data in the group and the remaining part of the identifier for the remaining portion of data in question or not.

When there is a cache line that matches the first part of the identifier for the first one of the portions of data in the group and the remaining part of the identifier for the remaining portion of data in question, then it can be, and is in an embodiment, determined that there is a cache line for that remaining portion of data in the group present in the cache (and so the identity of that cache line can be returned).

On the other hand, when there is not a cache line in the cache whose identifier matches both the first part of the identifier for the first one of the portions of data in the group and the remaining part of the identifier for the remaining portion of data in the group, then it can be, and is in an embodiment, determined that there is not a cache line for that remaining portion of data in the group present in the cache, and so the appropriate miss handling operation should be, and is in an embodiment, performed.

This will be done for each remaining portion of data in the group for which the first part of its identifier matches the first part of the identifier for the first one of the portions of data in the group. (As discussed above, any remaining portion of data in the group for which the first part of its identifier does not match the first part of the identifier for the first one of the portions of data in the group will be retried in another, later cycle.)

As discussed above, when a cache line for a portion of data is present in the cache (i.e. there is a "hit" for the portion of data in the cache), then the result of the comparison operation is in an embodiment to return an identifier, such as, and in an embodiment, an index, for the cache line in question (i.e. that identifies the cache line that has been allocated for the portion of data in the cache). (This will be distinct from the identifiers that identify the data itself, which are what are compared to determine whether a cache line for the portion of data is present in the cache—the cache line identifier that is returned as a result of a successful comparison (a "hit") will identify the cache line when the data is stored, rather than being an identifier for the data itself.)

In this case, the data processor (processing unit) that requires the data in the cache line can then, as appropriate, read the data from the cache line and use it for a processing operation (where the cache line already (validly) contains the data), or the relevant processing operation that requires the data may be stalled until the data in question is validly present in the cache line (e.g. in the case where a cache line has been allocated for the portion of data, but the data in question has not yet arrived in the cache from the memory). In this latter case, the processing operation that is waiting for the data that is to arrive at the cache line may, e.g., be added to a record of stalled processing operations, for example in an appropriate "parking" buffer.

The process of retrieving the data from the cache, and proceeding with the required processing operation, etc., can be performed in any suitable and desired manner, for example, and in an embodiment, in the normal manner for such operation in the data processor and data processing system in question. As there may be plural "hits" from the group of plural portions of data that are being looked up together, the cache and cache system is in an embodiment operable to and configured to be able to and to perform plural reads from the cache simultaneously.

In the case where the first part of the identifier for the remaining portion or portions of data in the group did not match the first part of the identifier for the first portion of data in the group, i.e. such that it is determined that, in effect, a lookup for the remaining portion or portions of data in the group into the cache was not performed, then as discussed above, the remaining portion or portions of data are in an embodiment indicated to be, and triggered to be, retried in another, e.g. the next, cycle.

Also, if a cache line cannot be allocated on a "miss" for a lookup (e.g. because all the cache lines are locked) then the lookup should be, and is in an embodiment retried in another, e.g. the next, cycle.

Any portions of data whose lookups are to be retried can, e.g., and in an embodiment, be added to a queue of cache lookups to be performed, so that they will be retried again. In an embodiment the "retry" operation takes any lookups that did not complete and (where possible) adds any new lookups up to the total (parallel) lookup capacity, and carries out all those lookups in the, e.g., next cycle.

Other arrangements for retrying the lookup for a portion or portions data would, of course, be possible.

In the case where the comparison process identifies a "cache miss" for a portion of data, then, as discussed above, an appropriate "miss handling" operation (a cache miss operation) is in an embodiment performed. Again, as there may be plural "misses" from the group of plural portions of data that are being looked up together, the cache and cache system is in an embodiment operable to and configured to be able to and to perform plural cache miss operations simultaneously.

The "miss handling" operation that is performed in the technology described herein can be any suitable and desired operation for handling a cache miss. Subject to any particular operation for the purposes of the technology described herein, the miss handling is in an embodiment performed in the normal manner for the data processor and data processing system in question.

Thus, in an embodiment, in response to determination of a "miss" in the cache for a portion of data, an appropriate cache line is allocated in the cache for the portion of data in question (and a corresponding request to fetch the data in question is sent to the memory system).

The line in the cache that is allocated for the portion of data that "missed" in the cache can be selected as desired. In an embodiment, a line that is available for allocation (e.g. that is not "locked" because it contains data that is still to be used) is allocated. (If no lines are available for allocation in the cache, then the operation is in an embodiment appropriately stalled until a line becomes available for allocation, and/or the lookup is retried.)

Any appropriate eviction policy, such as a least recently used policy, can be used to select the line to allocate, for example, and in an embodiment, in accordance with the normal eviction operation in the data processor and data processing system in question. Thus, for example, the (available) cache lines could be selected for allocation in turn, for example, on a round robin basis.

Other arrangements would, of course, be possible.

In an embodiment, the miss handling operation first determines whether the lookup for the first one of the portions of data in the group of plural portions of data was a "hit" or not, and if not, allocates a line for that first one of the portions of data, and then determines whether any lookups were able to be made for any of the remaining portions of data in the group, and if so, and there were misses for any of those lookups for the remaining portions of data in the group, then allocates lines in the cache to the remaining portions of data in the group (e.g. in their order in the group).

It is in an embodiment determined whether any lookups for the remaining portions of the data in the group were performed based on the comparison of the first part of the identifier for the first one of the portions of data in the group (which was accordingly then compared to the first parts of the identifiers for the cache lines in the cache) to the first parts of the identifier for any of the remaining portions of data in the group (as discussed above).

While it would be possible in the case where there are plural portions of data in the group for which a lookup in the cache was performed and for which a "miss" occurred, such that a line in the cache needs to be allocated for each of plural portions of data, to simply allocate any available lines in the cache to the plural portions of data (e.g. on a round robin basis) (and in one embodiment that is what is done), in an embodiment, lines in the cache are only allocated for plural portions of data in a group which encountered misses when a contiguous (adjacent) sequence of lines in the cache can be allocated to the plural portions of data in the group of data that encountered cache misses.

Thus, in an embodiment, the cache line allocation process only allocates (plural) lines in the cache for receiving portions of data in a group of plural portions of data where plural lookups for the portions of data in the group encountered cache misses where the portions of data that encountered cache misses can be allocated to consecutive (immediately adjacent) lines in the cache.

As will be discussed further below, this then simplifies the cache line tag updating circuit where plural misses were encountered, thereby simplifying the tag update circuit and correspondingly reducing the silicon area, etc., required for the cache line tag updating process, notwithstanding that there may be plural cache lines being allocated and updated together (simultaneously).

In this case, in the case where it is not possible to allocate consecutive cache lines for all the portions of data in the group that encountered cache misses, then in an embodiment, a cache line is only allocated for the first portion of data in the group (in the case where that portion of data encountered a miss), but for any remaining portions of data in the group that were able to be looked up and encountered misses, no lines are allocated, and the lookup for those portions of data is repeated in another cycle.

Once a line has been allocated for a portion of data that "missed" in the cache, the identity (index) for the allocated cache line is in an embodiment returned, so that the data processor and processing unit will know which cache line will be used for the portion of data in question.

The data identifier (tag) for the allocated cache line will also be updated to identify the portion of data in question. To do this, the appropriate first part of the cache line identifier (tag) will be updated to match the corresponding first part of the identifier for the portion of data in question, and the remaining part of the cache line identifier (tag) will be updated to match the remaining part of the identifier for the portion of data in question. More particularly, the first part of the cache line identifier (tag) is in an embodiment updated with the first part of the identifier for the first one of the portions of data in the group, and the remaining part of the cache line identifier (tag) is updated with the remaining part of the identifier for the particular portion of data that the cache line has been allocated to.

To facilitate this, the cache control circuit in an embodiment comprises an appropriate cache line identifier (tag) update circuit or circuits that is operable to and configured to (and can be activated to) update the identifiers (tags) for the cache lines in the cache.

In an embodiment, there is a (first) cache line identifier (tag) update circuit that is configured to be able to update the first part of the identifier (tag) for each cache line in the cache with the first part of the identifier for (a first) one of the portions of data in a group of plural portions of data in parallel (and that can be controlled to apply an update to any selected cache lines in the cache in a given cycle). This will then allow the first parts of the identifiers (tags) for any allocated cache lines to be updated together in common.

There is then in an embodiment a (second) cache line identifier (tag) update circuit that is configured to be able to, for each cache line in the cache, update the remaining part of the identifier (tag) for the cache line with the remaining part of the identifier for any one of the portions of data in a group of plural portions of data (and that can be controlled to apply an update to any selected cache line in the cache in a given cycle). This will then allow the remaining parts of the identifiers (tags) for any allocated cache lines to be updated separately in parallel (simultaneously).

In an embodiment, this (second) cache line identifier (tag) update circuit is configured (only) to be able to, for respective groups of cache lines corresponding to the number of portions of data in a group of plural portions of data that will be looked up in the same cycle, update the remaining part of the identifiers (tags) for the group of cache lines with the remaining part of the identifier for any of the portions of data in a group of plural portions of data (i.e. to be able to multiplex the remaining parts of the identifiers from the portions of data of a group of plural portions of data onto a corresponding number of cache lines).

Thus, in response to a miss for the first one of the portions of data in the group, a cache line is allocated for the first one of the portions of data, and the data identifier (tag) for the allocated cache line is updated by updating the appropriate first part of the cache line identifier (tag) to match the corresponding first part of the identifier for the first one of portions of data in the group (which in this case is the portion of data in question) and then updating the remaining part of the cache line identifier (tag) is updated with the remaining part of the identifier for the portion of data.

Correspondingly, in response to a miss for another one (a second one) of the portions of data in the group, a cache line is allocated for the portion of data, and the data identifier (tag) for the allocated cache line is updated by updating the appropriate first part of the cache line identifier (tag) to match the corresponding first part of the identifier for the first one of the portions of data in the group (since this will be the same as for the portion of data in question), and then separately updating the remaining part of the cache line identifier (tag) is updated with the remaining part of the identifier for the (second) portion of data that the cache line has been allocated for.

Thus, for a portion of data in the group other than the first portion of data whose first part of the identifier matches the first part of the identifier for the first portion of data, but whose second part of the identifier does not match any of the cache lines in the cache, a cache line is allocated for the (other) portion of data, and the cache line identifier (tag) is updated by updating the first part of the identifier for the cache line to match the corresponding first part of the identifier for the first one of the portions of data in the group; and updating the second part of the identifier for the cache line to match the corresponding second part of the identifier for the (other) portion of data that the cache line has been allocated to.

For instance because the first part of the identifier is common for all of the portions of data in the group of plural portions of data the first part of the identifier can be updated with the first part of the identifier for (a first) one of the portions of data which is then effectively copied for the other portions of data in the group of plural portions of data. This therefore saves the need to multiplex the identifiers in full, as it is only the remaining parts of the identifiers from the portions of data of a group of plural portions of data that need to be multiplexed onto a corresponding number of cache lines. In this way the updating of the identifiers (tags) for the cache lines in the cache can be simplified, e.g. by reducing the number of multiplex operations that need to be performed.

This can then allow the updating circuit to be simplified, as compared, for example, to arrangements where the update circuit has to be able to multiplex the remaining part of the identifiers for a group of plural portions of data to any cache lines and in any order.

In this case, to further facilitate this updating arrangement, the allocation of cache lines for portions of data is in an embodiment constrained, as discussed above, such that where plural cache lines for a group of plural portions of data need to be allocated, that is only done if plural consecutive cache lines can be allocated.

For example, in that case, the allocation of cache lines for portions of data may be constrained such that data will be written into the consecutive cache lines in (e.g.) an interleaved manner, again potentially reducing the number of multiplexes that may be required.

It will be appreciated from the above that the operation in the manner of the technology described herein can be used for any one or more desired and suitable caches that the data processor and data processing system has. In respect of any given cache, in an embodiment, groups of portions of data of the same size, and for which the identifiers are always divided into the same first and remaining parts, are used, but the sizes of the groups of portions of data, and the first and remaining parts of the identifiers can, and in an embodiment do, vary as between different caches of the data processor and in the system.

As will be appreciated by those skilled in the art, the data processor of the technology described herein may be part of an overall data processing system that includes, e.g., and in an embodiment, a host processor that, e.g., executes applications that require processing by the processor. The host processor will send appropriate commands and data to the processor to control it to perform processing operations and to produce processing output required by applications executing on the host processor. To facilitate this, the host processor should, and in an embodiment does, also execute a driver for the processor. The host processor may also execute a compiler or compilers for compiling programs to be executed by (e.g., a programmable processing stage of the) processor.

The data processor may also comprise, and/or be in communication with, one or more memories and/or memory devices that store the data described herein, and/or the output data generated by the data processor, and/or store software (e.g. program) for performing the processes described herein. The processor may also be in communication with a host microprocessor, and/or with a display for displaying images based on the data generated by the processor.

In general the technology described herein may be used with any form of processor, such as a CPU, GPU, NPU, DSP, etc., and any form of cache, such as an L2 cache, an L3 cache, a system cache, etc.

The technology described herein can be used for all forms of input and output that a processor may use and be used to generate. For example, in the case of a graphics processor, the graphics processor may use textures, generate frames for display, render-to-texture outputs, etc. Any output data values from the processing are in an embodiment exported to external, e.g. main, memory, for storage and use, such as to a frame buffer for a display.

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or microprocessor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuit, circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, NVRAM, SSD, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, NVRAM, SSD, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processor (graphics processing unit (GPU)) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

Figure 2:
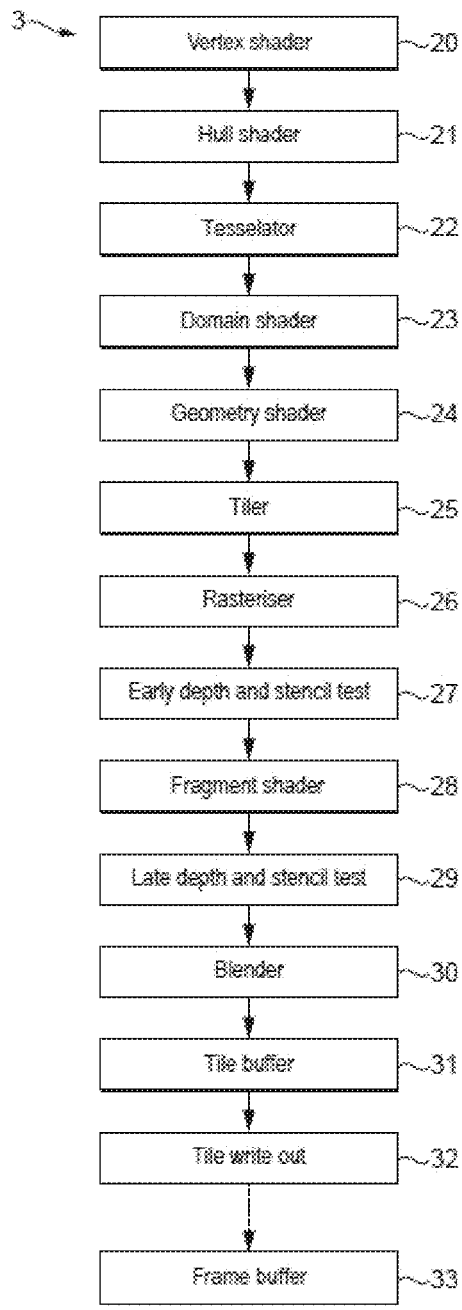
FIG. 2 shows schematically an embodiment of a graphics processing pipeline that can operate in accordance with an embodiment of the technology described herein.

FIG. 2 shows the graphics processor 3 of the present embodiment in more detail.

The graphics processor 3 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions (areas), usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a set of geometry, typically a series of primitives (polygons), which geometry (e.g. primitives) is then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processor 3 that are relevant to the operation of the present embodiment. As will be appreciated by those skilled in the art there may be other elements and stages of the graphics processor (graphics processing pipeline) that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline that the graphics processor 3 executes includes a number of stages, including vertex shader 20, a hull shader 21, a tesselator 22, a domain shader 23, a geometry shader 24, a tiler 25, a rasterisation stage 26, an early Z (depth) and stencil test stage 27, a renderer in the form of a fragment shading stage 28, a late Z (depth) and stencil test stage 29, a blending stage 30, a tile buffer 31 and a downsampling and writeout (multisample resolve) stage 32.

The vertex shader 20 takes the input data values associated with the vertices, etc., defined for the output to be generated, and processes those data values to generate a set of corresponding "vertex shaded" output data values for use by subsequent stages of the graphics processing pipeline 3. In the present embodiment, the vertex shader 20 is in the form of a shader pipeline (a programmable vertex shader) implemented by an execution engine 120, but other arrangements, such as the use also or instead of fixed function vertex shading units would be possible, if desired. The vertex shading operation is illustrated in more detail in FIG. 3.

Each primitive to be processed is usually defined by and represented as a set of vertices. Each vertex for a primitive typically has associated with it a set of "attributes", i.e. a portion of data values for the vertex. These attributes will typically include position data and other, non-position data (varyings), e.g. defining colour, light, normal, texture coordinates, etc., for the vertex in question.

Figure 3:
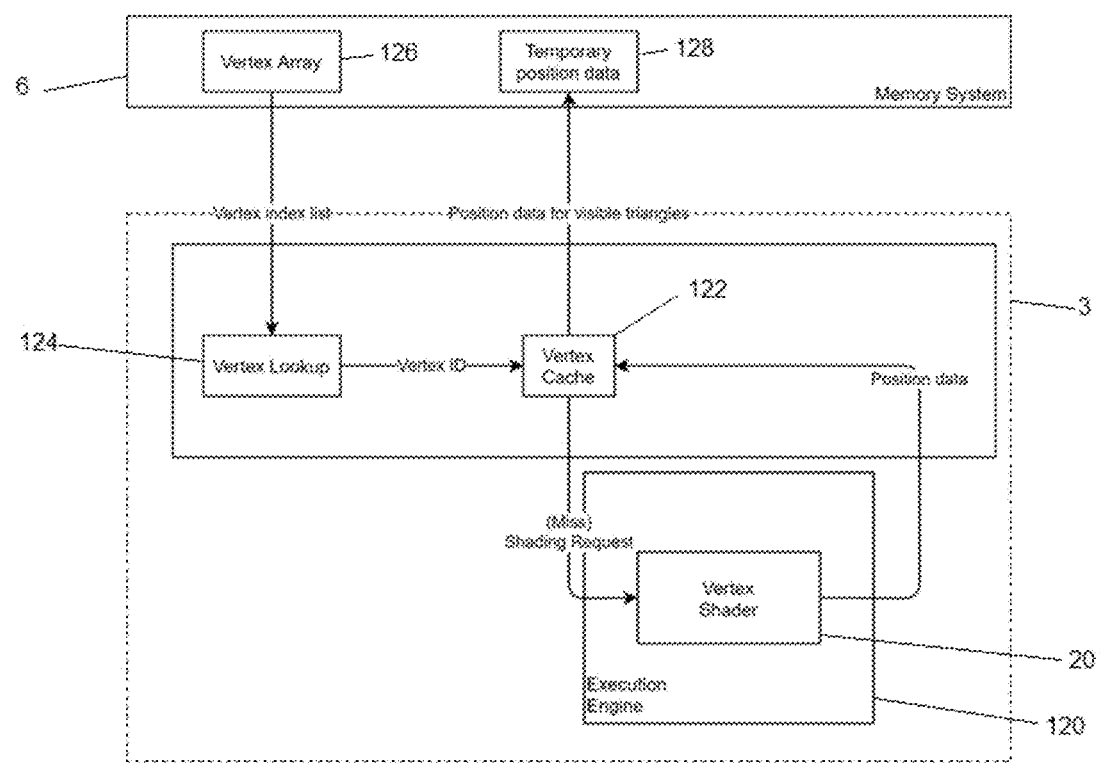
FIG. 3 schematically a vertex shader that can operate in accordance with an embodiment of the technology described herein.

As shown in FIG. 3, the input data values for the vertex shading are stored as an array of vertex data 126 in a memory system 6 with which the vertex shader 20 is in communication with.

For a given output to be generated by the graphics processor, there will typically be a set of vertices defined for the output in question. The primitives to be processed for the output will then be indicated as comprising given vertices in the set of vertices for the graphics processing output being generated.

The vertex shader 20 is thus operable to read in vertex data 126 for the primitives to be processed and to process (shade) the vertex data in order to determine a set of vertex shaded data (temporary position data) 128 in a suitable format for the subsequent graphics processing operations.

In response to a shading request for a particular set of vertices, a vertex lookup 124 may thus performed to read in the relevant vertex data 126 from the memory system 6. As shown in FIG. 3, in the present embodiment these requests are handled using a suitable vertex cache 122 that temporarily holds the data required by and/or generated from the vertex shader 20.

When the vertex shader 20 needs data for a particular vertex, the vertex shader 20 is thus operable to issue a request to the vertex cache 122 to see if that data is available in the cache. If the vertex data is already in the vertex cache 122, the data can then be provided to the vertex shader 20 for processing. On the other hand if the vertex data is not in the vertex cache 122, one or more cache lines in the vertex cache 122 are allocated for that data, and a controller for the vertex cache 122 then issues a vertex lookup 124 to the memory system 6 for fetching the data into the vertex cache 122.

The vertex shading operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in, modifying the input data to take account of the effect of lighting in the image to be rendered, etc.

The shaded position data 128 generated in this way can then written out from the vertex shader 20 to the memory system 6 via the vertex cache 122.

The hull shader 21 performs operations on sets of patch control points and generates additional data known as patch constants. The tessellation stage 22 subdivides geometry to create higher-order representations of the hull, and the domain shader 23 performs operations on vertices output by the tessellation stage (similar to a vertex shader). The geometry shader 24 processes entire primitives such as a triangles, points or lines.

These stages together with the vertex shader 20 effectively perform all the necessary fragment frontend operations, such as transformation and lighting operations, and primitive setup, to setup the primitives to be rendered, in response to commands and vertex data provided to the graphics processor 3.

Once all the primitives to be rendered have been appropriately set up, the tiler 25 then determines which primitives need to be processed for each tile that the render output has been divided into for processing purposes. To do this, the tiler 25 compares the location of each primitive to be processed with the tile positions, and adds the primitive to a respective primitive list for each tile that it determines the primitive could (potentially) fall within. Any suitable and desired technique for sorting and binning primitives into tile lists, such as exact binning, or bounding box binning or anything in between, can be used for the tiling process.

Once lists of primitives to be rendered (primitive-lists) have been prepared for each rendering tile in this way, the primitive-lists are stored for use, e.g., to allow the system to identify which primitives need to be considered (and rendered) when the tile in question is rendered.

Once the tiler has completed the preparation of the tile lists (lists of primitives to be processed for each tile), then each tile can be rendered.

To do this, each tile is processed by the graphics processing pipeline stages shown in FIG. 2 that follow the tiler 25.

Thus, when a given tile is being processed, each primitive that is to be processed for that tile (that is listed in a tile list for that tile) is passed to the rasteriser 26.

The rasterisation stage 26 of the graphics processing pipeline 3 operates to rasterise the primitives into individual graphics fragments for processing. To do this, the rasteriser 26 rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 27 performs a Z (depth) test on fragments it receives from the rasteriser 26, to see if any fragments can be discarded (culled) at this stage. To do this, it compares the depth values of (associated with) fragments issuing from the rasteriser 26 with the depth values of fragments that have already been rendered (these depth values are stored in a depth (Z) buffer that is part of the tile buffer 31) to determine whether the new fragments will be occluded by fragments that have already been rendered (or not). At the same time, an early stencil test is carried out.

Fragments that pass the fragment early Z and stencil test stage 27 are then sent to the fragment shading stage 28. The fragment shading stage 28 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments (by a texture mapper circuit in the fragment shading stage 28), applying fogging or other operations to the fragments, etc., to generate the appropriate fragment data. In the present embodiment, the fragment shading stage 28 is in the form of a shader pipeline (a programmable fragment shader).

Figure 4:
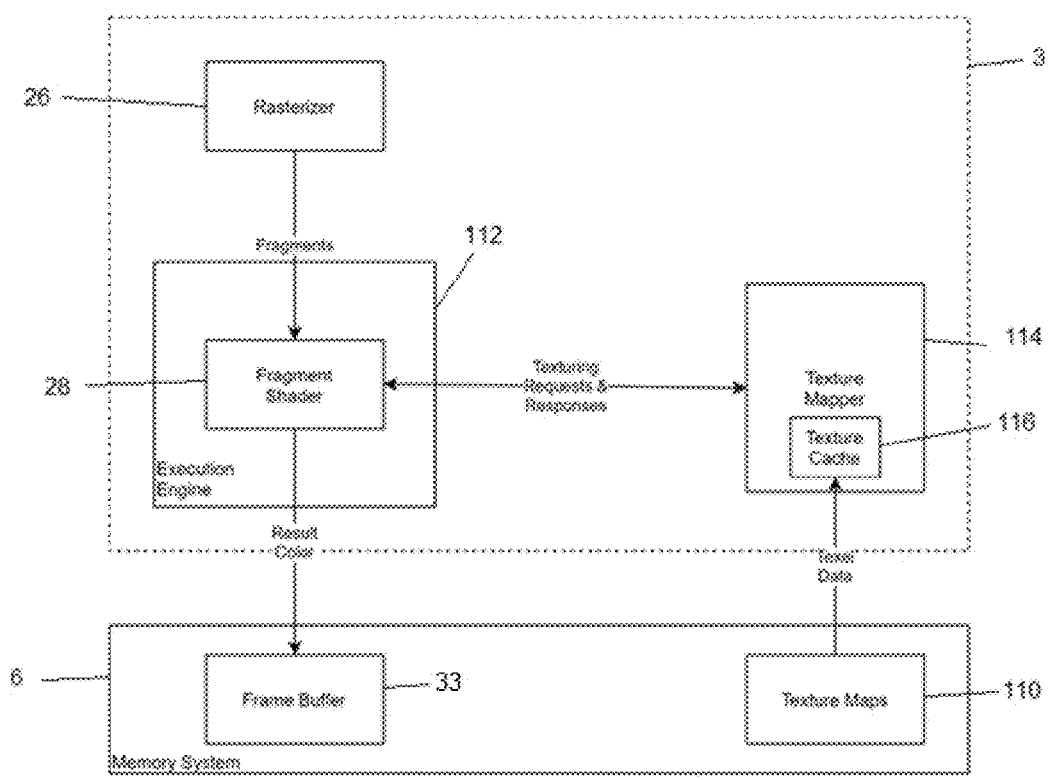
FIG. 4 shows schematically a texture mapper that can operate in accordance with an embodiment of the technology described herein.

FIG. 4 shows in more detail the stages of the graphics processing pipeline that the graphics processor 100 executes after the graphics primitives (polygons) for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor.

As shown in FIG. 4, this part of the graphics processing pipeline includes a rasteriser 26 and a rendering stage (renderer) in the form of a fragment shading stage (fragment shader) 28. The graphics processor also includes and/or has access to (is in communication with) appropriate memory system 6 for storing the data that the processor will use and/or generate, such as a depth and stencil buffer(s), tile buffers, a frame buffer 33, texture maps 110, etc.

As described above, the rasteriser 26 operates to rasterise the primitives making up the render output (e.g. the image to be displayed) into individual graphics fragments for processing. Fragments generated by the rasteriser 26 are sent onwards to the fragment shading stage 28 (the renderer), as shown in FIG. 4. As shown in FIG. 2, the fragments may be subjected to early culling tests, such as depth tests, before being sent to the fragment shader 28, if desired.

The fragment shading stage 28 performs the appropriate fragment processing (rendering) operations on the fragments it receives, so as to process the fragments to generate the appropriate rendered fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data.

In the present embodiment, the fragment shading stage 28 is in the form of a shader pipeline (a programmable fragment shader) implemented by an execution engine 112, but other arrangements, such as the use also or instead of fixed function fragment shading units would be possible, if desired.

As shown in FIG. 4, as part of its operation the fragment shader 104 will use textures when shading the fragments it receives from the rasteriser 102, and as part of that texturing process will apply texture sample data (texels) using a texture mapper 114 of the graphics processor 100. To do this, a texture map 110 is read into the texture mapper 114 via a suitable texture cache 116 (which may, e.g., comprise an L1 cache). The fragment shader 28 is then operable to issues texturing requests to the texture mapper 114 that applies the textures indicated by the texture map 110 to the fragments and then provides the textured fragment data back to the fragment shader 28 for further processing (blending, etc.).

There is then a "late" fragment Z and stencil test stage 29, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 31 to determine whether the fragment data for the new fragments should replace the fragment data of the fragments that have already been rendered, by comparing the depth values of (associated with) fragments issuing from the fragment shading stage 28 with the depth values of fragments that have already been rendered (as stored in the depth buffer). This late fragment depth and stencil test stage 29 also carries out any necessary "late" alpha and/or stencil tests on the fragments.

The fragments that pass the late fragment test stage 29 are then subjected to, if required, any necessary blending operations with fragments already stored in the tile buffer 31 in the blender 30. Any other remaining operations necessary on the fragments, such as dither, etc. (not shown) are also carried out at this stage.

Finally, the (blended) output fragment data (values) are written to the tile buffer 31 from where they can, for example, be output for display to a frame buffer 33 that resides in the memory system 6. The depth value for an output fragment is also written appropriately to a Z-buffer within the tile buffer 31. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 31 is input to a downsampling (multisample resolve) write out unit 32, and thence output (written back) to an external memory output buffer, such as a frame buffer 33 of a display device (not shown). (The display device could comprise, e.g., a display comprising an array of pixels, such as a computer monitor or a printer.)

The downsampling and writeout unit 32 downsamples the fragment data stored in the tile buffer 31 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 33 in a main memory) for storage, the next tile is then processed, and so on, until sufficient tiles have been processed to generate the entire render output (e.g. frame (image) to be displayed). The process is then repeated for the next render output (e.g. frame) and so on.

As can be seen from FIG. 2, the graphics processing pipeline 3 includes a number of programmable processing or "shader" stages, namely the vertex shader 20, hull shader 21, domain shader 23, geometry shader 24, and the fragment shader 28. These programmable shader stages execute respective shader programs that have one or more input variables and generate sets of output variables. Typically the shader program in question will be executed for each work item (e.g. vertex in the case of a vertex shader) to be processed. Typically an execution thread will be issued for each work item to be processed, and the thread will then execute the instructions in the shader program to produce the desired "shaded" output data.

The application 2 provides the shader programs to be executed using a high-level shader programming language, such as GLSL, HLSL, OpenCL, etc. These shader programs are then translated by a shader language compiler to binary code for the target graphics processing pipeline 3. This may include the creation of one or more internal (intermediate) representations of the program within the compiler. (The compiler may, e.g., be part of the driver 4, with there being a special API call to cause the compiler to run. The compiler execution can thus be seen as being part of the, e.g. draw call preparation done by the driver in response to API calls generated by an application).

Other arrangements for the graphics processor 3 would, of course, be possible.

The present embodiments relate in particular to the situation in which the graphics processor 3 requires access to data from a cache. This may, for example, comprise vertex data that is accessed via the vertex cache 122 (as shown in FIG. 3), or texture data that is accessed via the texture cache 116 (as shown in FIG. 4). However, the present embodiments may be applied to any other type of data that may suitably be cached for use by the graphics processor 3.

In particular, the present embodiments provide an efficient mechanism for performing multiple cache lookups together. For example, where multiple portions (pieces) of data are required, it may be desirable to fetch these in one go, in the same processing cycle or cycles, rather than performing separate cache lookups for each portion of data in turn.

Figure 5:
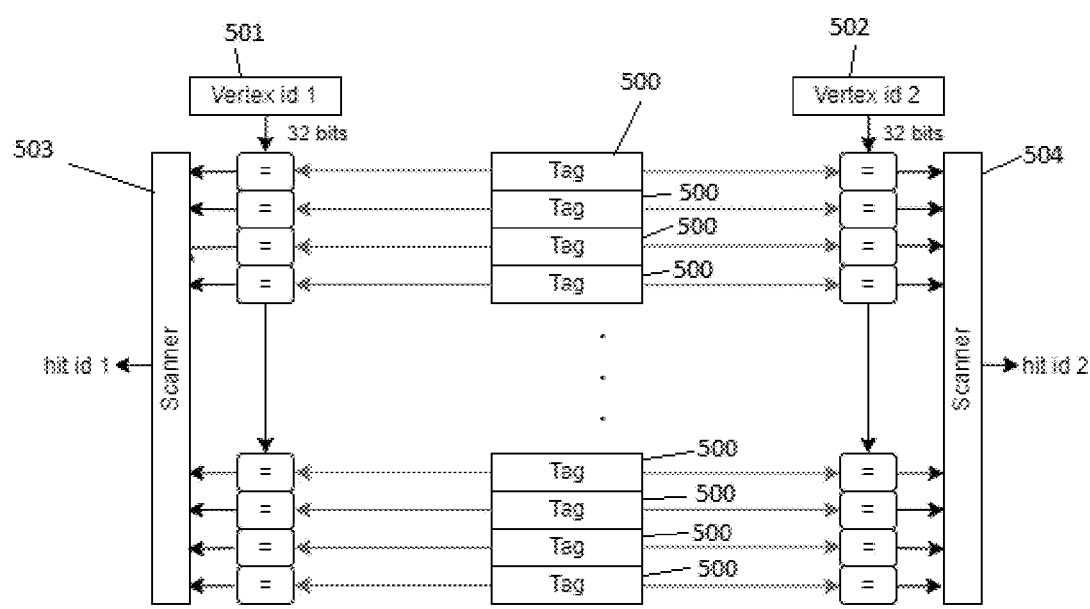
FIG. 5 shows schematically an example of how a cache lookup for multiple portions of data could be performed according to an arrangement.

FIG. 5 illustrates one possible mechanism for looking up two data portions together. In particular, FIG. 5 shows an example in the context of a vertex cache wherein a lookup is performed for two vertices, each vertex having its own unique 32-bit vertex identifier, i.e.: 'vertex_id_1' 501 or 'vertex_id_2' 502.

In the vertex cache as shown in FIG. 5, each cache line is associated with a cache line tag 500 for storing a suitable identifier of the data that is stored in that cache line. For each incoming vertex identifier 501, 502 that is being looked up, a tag comparator is provided that compares the (full) incoming vertex identifier 501, 502 separately against all of the cache line tags 500 to determine whether the data indicated by the vertex identifier 501, 502 is stored in one of the cache lines 500.

Each incoming vertex identifier (i.e. each incoming vertex lookup) has an associated scanner 503, 504 that takes all of the outputs of the comparisons for the vertex identifier 501, 502 for the corresponding incoming vertex with each of the cache line identifiers 500 in the cache to determine the cache line in the cache (if any) that stores the required vertex data (if present in the cache). To do this, the scanner finds the first enabled comparison bit (indicating a "hit), if any, and generates the cache line id for it.

The cache lines are thus compared in parallel for each of the incoming vertex identifiers and where there is a cache "hit" for one of the vertex identifiers (i.e. the vertex identifier matches the identifier for one of the cache lines), this is indicated. On the other hand, if the required data is not stored in the cache, i.e. there is a cache "miss", a cache line may be allocated for that data, and the data fetched into the cache, etc., e.g. in the normal way.

It will be appreciated that the FIG. 5 arrangement thus requires each of the vertex identifiers to be compared in full against each and every cache line in the cache.

Thus, in the arrangement shown in FIG. 5, the number of tag comparators has to be doubled in order to perform two lookups, resulting in an increase in required silicon area. For example, for a typical cache size of 512 cache lines each having a 32-bit cache line tag this may require an additional 16384 xnor gates for the comparisons of the second vertex identifier 502, as well as additional associated logic. Further, the tag inputs in this arrangement must be multiplexed since every cache line tag 500 needs to select its input between the two vertices being looked up (since each of the two vertices may end up in any cache line). This adds another 512 32-bit 2-to-1 multiplexers.

The present embodiment thus provides a more efficient way to perform multiple cache lookups in a single operation (e.g. compared to the arrangement of FIG. 5). This is illustrated in FIGS. 6A, 6B and 7.

Figures 6A, 6B:
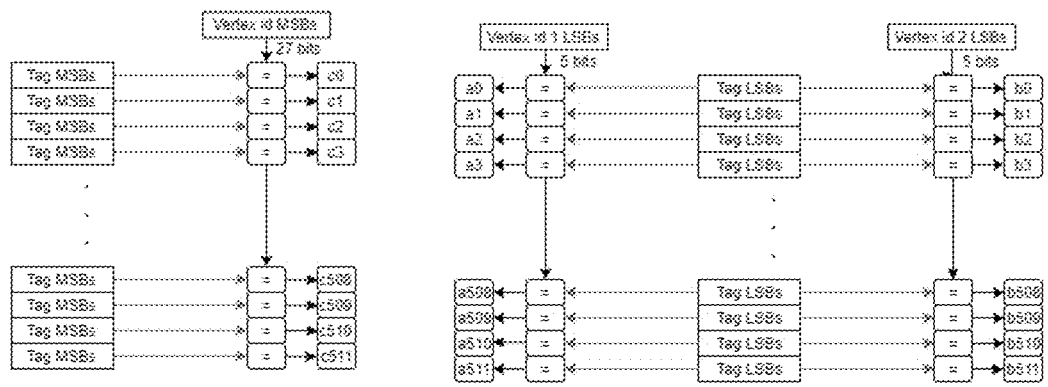
FIGS. 6A and 6B show schematically a cache lookup for multiple portions of data according to an embodiment of the technology described herein.

As shown in FIGS. 6A and 6B, rather than comparing the full vertex identifiers against each of the cache line tags for each of the two incoming vertex lookups, in the present embodiment the vertex identifiers and cache line tags are split into two parts, a first part containing a number of most significant bits (in this example, the first 27 bits of the 32-bit identifiers) and a second part that contains the remaining less significant bits (in this example, the final 5 bits).

Figure 7:
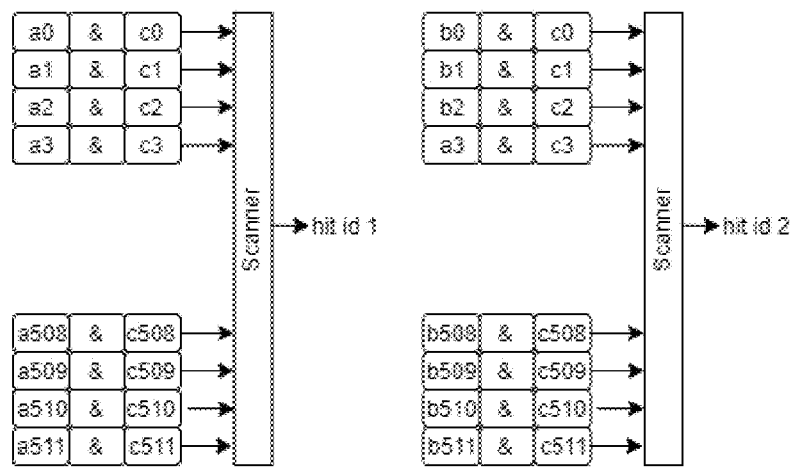
FIG. 7 shows schematically further details of the cache lookup for multiple portions of data according to an embodiment of the technology described herein.

As shown in FIGS. 6A, 6B and 7 a number of separate comparisons are then performed using these two parts in order to determine whether the vertex data associated with either of the incoming vertex lookups is already stored in the cache.

Figure 8:
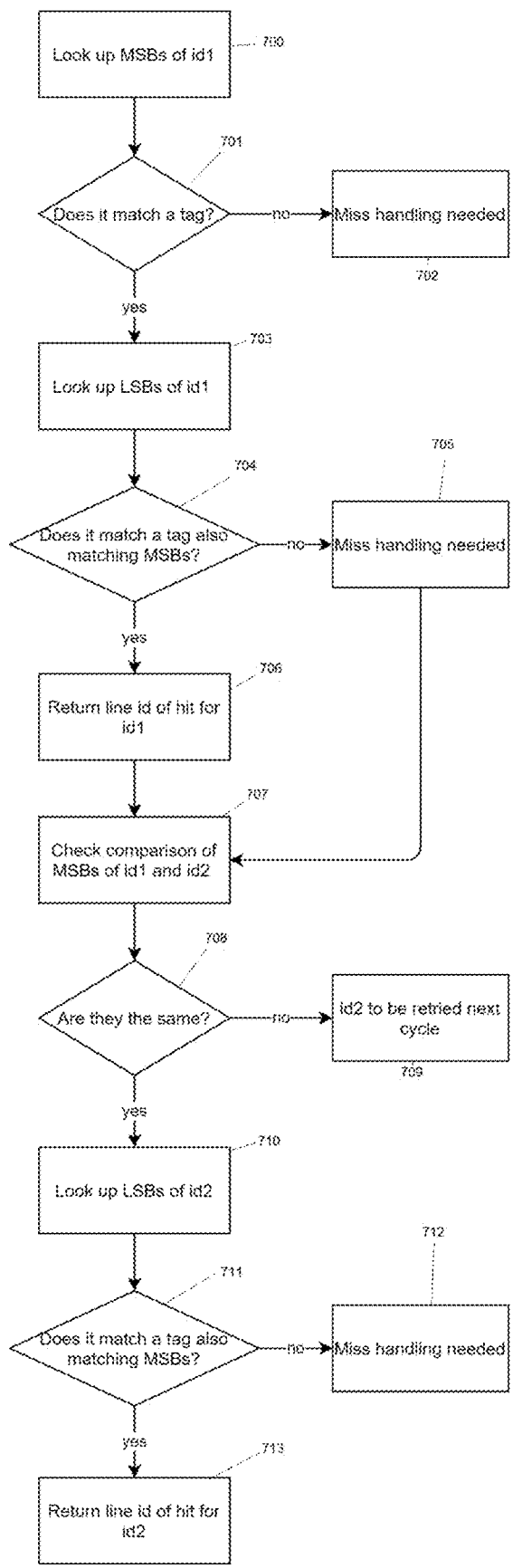
FIG. 8 is a flowchart illustrating a cache lookup for multiple portions of data according to an embodiment of the technology described herein.

The overall processing flow for the multiple cache lookup according to the present embodiment is shown in FIG. 8.

Firstly, a comparison of the most significant bits for (and only for) the first vertex identifier (in this example 'vertex_id_1') is made against the most significant bits for each of the cache lines (step 700). That is, a first comparison is made between the first part of the first vertex identifier and the corresponding first parts of the cache line tags. This first comparison is shown schematically in FIG. 6A.

It is then determined whether the most significant bits for the first vertex identifier match one of the cache line tags (step 701). If the most significant bits do not match any of the cache line tags (step 701—No), a miss handling operation is performed (step 702), as will be explained further below.

On the other hand, if it is determined that the most significant bits do match one or more of the cache line tags (step 701—Yes), a comparison is then performed for the least significant bits for the first vertex identifier (step 703). That is, when it is determined that the first part of the first vertex identifier matches the corresponding first part of one or more of the cache line tags, the second part of the first vertex identifier is then compared against the corresponding second parts of (at least) the one or more of the cache line tags for which there was a match in the first part.

If the least significant bits for the first vertex identifier match ones of the cache line tags that was determined (in step 701) to match the most significant bits for the first vertex identifier (step 704—Yes), there is a cache hit for the first vertex identifier and the cache line index (id) for the cache line that matched both the most and least significant bits of the first vertex identifier is then returned (step 706). This second comparison is shown in FIG. 6B, on the left hand side.

(On the other hand if the least significant bits for the first vertex identifier does not match any of cache line tags that was determined to match the most significant bits for the first vertex identifier (step 704—No), there is a cache miss, and a miss handling operation is performed (step 705)).

A comparison is then made between the most significant bits of the first vertex identifier and the second vertex identifier ('vertex_id_2') (step 707). That is, the first part of the first vertex identifier is then compared with the first part of the second vertex identifier. When the first vertex identifier and the second vertex identifier are determined share the same most significant bits (step 708—Yes), a comparison is then performed for the least significant bits for the second vertex identifier (step 710). This comparison is shown in FIG. 6B, on the right hand side.

In a similar manner as for the first vertex identifier, if the least significant bits for the second vertex identifier are determined to match a cache line tag that also matches the most significant bits (determined in step 701), there is a cache hit for the second vertex identifier (step 711—Yes), and the cache line index (id) for the second vertex identifier is thus returned (step 713). When the least significant bits for the second vertex identifier do not match any of the cache line tags that also matches the most significant bits (step 711—No), a miss handling operation is performed (step 712).

Otherwise, if the most significant bits for the second vertex identifier are different from the most significant bits for the first vertex identifier (step 708—No), the second vertex identifier is tried again in the next cycle (step 709).

Although described in sequence, it will be appreciated that there is no particular ordering requirement for these comparisons and in the present embodiment all of the comparisons are performed in parallel, and then considered (e.g.) in the manner described above to perform the desired cache lookups.

Therefore, in the present embodiment instead of having to perform the comparisons in full for each vertex identifier (as in FIG. 5) the two vertex lookups can share the most significant bit comparisons, and only the least significant bits of the cache line tags need to be compared against both vertex identifiers.

Thus, as shown in FIG. 7, the comparisons for the first and second vertex identifiers share the same comparison of the most significant bits.

This approach works well because in many cases it is expected that the vertex identifiers that are being looked up will be similar to each other, such that the first parts (the most significant bits) are likely to be substantially the same. For instance, most of the time it is expected that due to spatial locality, etc., that consecutive vertex identifiers will share many of the same most significant bits.

The number of most significant bits in common may be selected to increase the likelihood that this is the case. For instance, there is a trade-off between increasing the number of most significant bits that are used in the first comparison (to reduce the number of comparisons that need to be performed) and reducing the likelihood that the two vertices will share that number of most significant bits in common. That is, the more most significant bits that are shared, the more silicon area can be saved, but the less often that the dual lookup will be successful (in which case one vertex is delayed by one cycle).

Figures 9, 10:
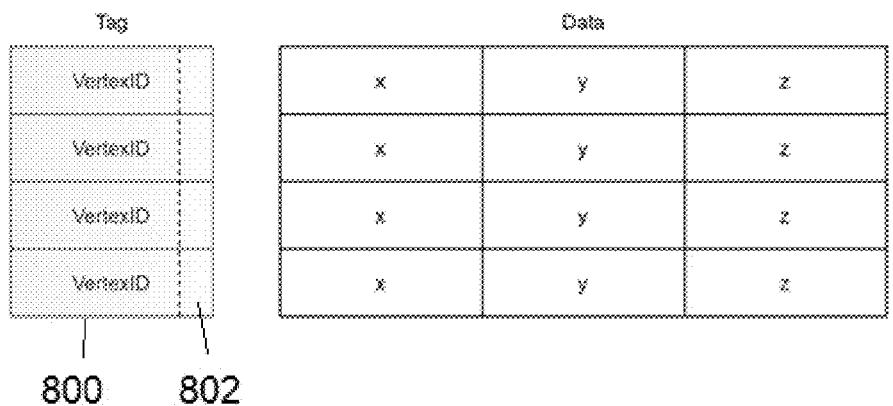
FIG. 9 shows schematically an example of how a vertex identifier can be divided into two parts for use in the multiple cache lookup according to an embodiment of the technology described herein.
FIG. 10 shows schematically an example of how an identifier for texture data can be divided into two parts for use in the multiple cache lookup according to an embodiment of the technology described herein.

FIG. 9 shows an example of this in the vertex cache. As shown here, the (data) identifiers in the cache line tags are split into two parts: a first part 800 corresponding to a number of most significant bits, and a second part 802 corresponding to a number of least significant bits. In this example, the first part contains the 27 most significant bits, and the second part contains the remaining 5 least significant bits. However, the bits may be divided between the two parts in any other suitable manner as desired.

According to the present embodiment only the second part (the least significant bits) 802 of the cache line tag identifiers are compared against the corresponding least significant bits both of the vertex identifiers, whereas the first part (the most significant bits) 800 of the cache line tag identifier is only compared against the first vertex identifier.

Whilst an example has been described above in relation to the vertex cache, similar advantages arise in other situations where it may be desired to read in multiple portions of data together, e.g. to improve the graphics processor's performance.

For example, FIG. 10 illustrates another example in relation to a texture cache. In this case, the texture data is tagged with a set of parameters indicating the texture ID, the surface ID, the texel format, together with the x, y, z texture coordinates. In this case, a set of the most significant bits of each texture coordinate could be used for the first part of the identifier together with the appropriate parameters identifying the texture in question (the texture ID, surface ID and texel format). The first comparison is thus performed using this information. When there is a match based on this part of the identifier, a further comparison is then performed using the remaining least significant bits for the x, y, z co-ordinates 900, 902, 903, e.g. in an analogous manner described above.

As well as providing a more efficient lookup operation, the present embodiment also simplifies updating the cache line identifiers (tags) for the miss handling operation. For instance, if a lookup is performed for the two vertices, and one or both of the vertices miss, respective cache lines are then allocated for that data.

Figure 11:
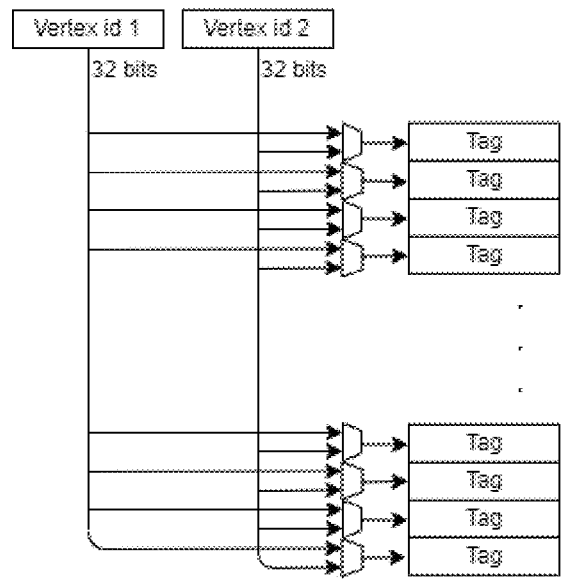
FIG. 11 shows schematically a cache line identifier (tag) update mechanism for the cache lookup operation according to the arrangement shown in FIG. 5.

For the arrangement shown in FIG. 5, where the vertex identifiers are used and compared in full, when the cache line tags are to be updated, a multiplex operation may need to be performed in front of each cache line tag to select the correct input vertex index. This is illustrated in FIG. 11.

However, the present embodiment also allows for a more efficient cache line tag updating mechanisms.

Figure 12:
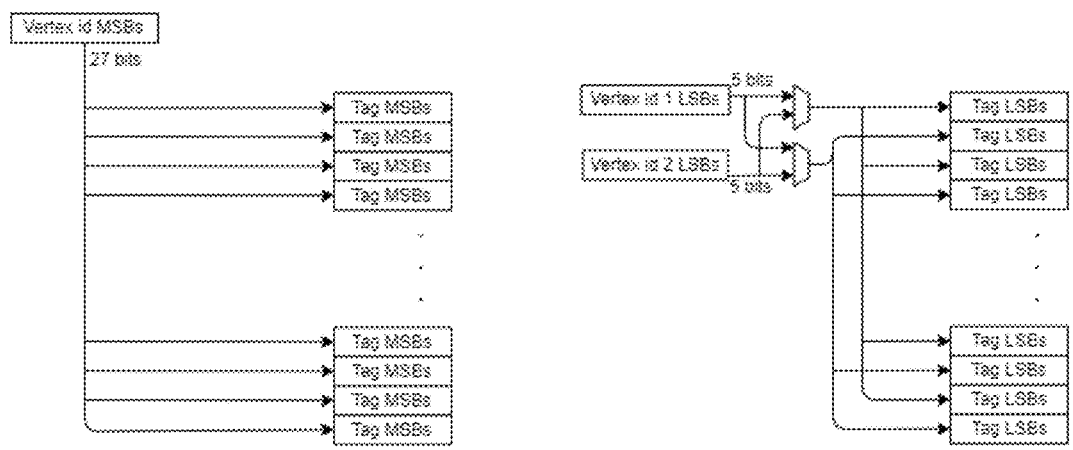
FIG. 12 shows schematically a cache line identifier (tag) update mechanism according to an embodiment of the technology described herein.

As shown in FIG. 12, the cache line tag update is again performed in two steps. Firstly, because it is known that the two vertices share most significant bits, the most significant bits from one of the vertex identifiers (e.g. vertex_id_1) can be copied into all of the cache lines (since they are common to the whole look up). That is, the first parts of any cache line tag identifiers that need to be updated are updated to match the corresponding first part of the first vertex identifier (and there is no need to consider the first parts of the other vertex identifiers). This simplifies the multiplex operations since it is only the remaining parts of the vertex identifiers that need to be multiplexed.

Further, in the present embodiment the cache line allocation is constrained such that when plural cache lines need to be allocated (for plural vertices), plural cache lines are only allocated when it is possible to allocate immediately adjacent, consecutive cache lines. This means that the cache is constrained to only be able to write data for the two incoming vertex requests (if both vertex requests are determined to miss in the cache) to two consecutive lines in the cache. In this case it is known that the data will be written into the cache lines in a certain order, so there is only one multiplex operation required to select all the results for the first vertex and one multiplex operation required to select all the results for the second vertex. Thus, as shown in FIG. 11, there are now only two multiplexes required (once for each vertex identifier).

Figure 13:
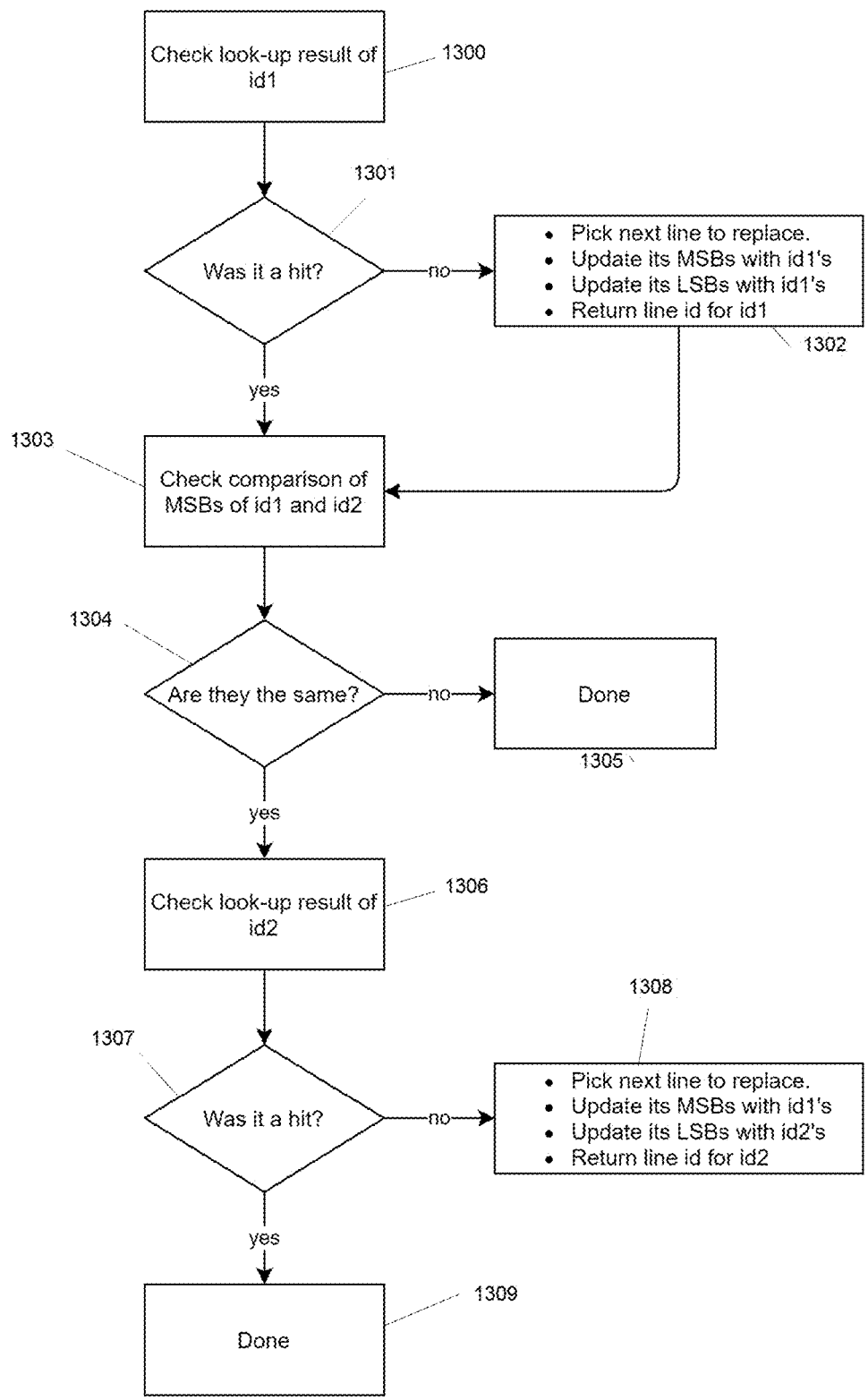
FIG. 13 illustrates the cache line replacement policy according to an embodiment of the technology described herein.
Figure 14:
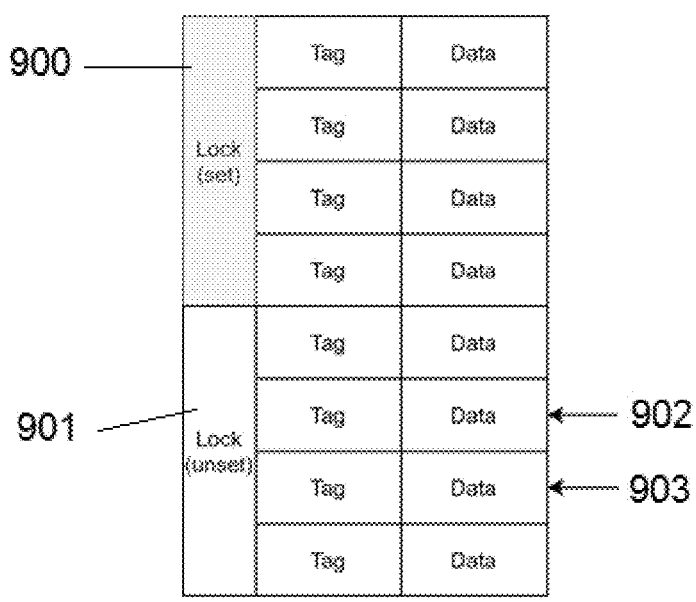
FIG. 14 is a flowchart illustrating the cache line replacement policy shown in FIG. 13.

FIGS. 13 and 14 illustrate a suitable cache replacement policy according to the present embodiment.

As shown in FIG. 13, when checking the lookup result for the first vertex identifier (step 1300), e.g. as shown in FIG. 7, it is determined whether or not there is a hit for the first vertex identifier. In the event that the first vertex identifier misses in the cache (step 1301—No), the cache replacement policy is implemented by selecting the next line to be evicted, and then updating the cache line tag for that line (by separately updating the most and least significant bits for the cache line tag with those of the first vertex identifier, e.g. as shown in FIG. 12). Once the cache line tag has been updated, the cache line index (id) is then returned (step 1302) and the process then moves on to compare the most significant bits for the first and second vertex identifiers is performed (step 1303) as described above.

On the other hand, if there is a hit in the cache for the first vertex identifier (step 1301—Yes), the comparison of the most significant bits for the first and second vertex identifiers is then performed directly (step 1303). If these are not the same (step 1304—No), the process is done and the second vertex identifier must be processed in the next cycle (step 1305).

If these are the same (step 1304—Yes), the process proceeds to check the lookup result for the second vertex identifier (step 1306). Similarly as with the first vertex identifier, if the second vertex identifier missed in the cache (step 1307—No), the cache replacement policy is implemented and the cache line tag is updated based on the second vertex identifier (step 1308). If the second vertex identifier hits in the cache (step 1307—Yes) the data can be retrieved, and the process is done (step 1309).

Thus, as shown in FIG. 14, the cache may contain a number of locked cache lines 900 that cannot be allocated (unless they are unlocked), and a number of unlocked cache lines 901 that are free for re-allocation. A suitable cache line eviction policy such as a round robin policy can then be used to pick the next cache lines to evict. For instance, where there are two lookups being performed, two cache lines should be selected for eviction: the next cache line to evict 902, to be allocated either for the first vertex identifier if there is a miss on the first vertex identifier or for the second vertex identifier if there is a hit on the first vertex identifier and a miss on the second vertex identifier; and the second next cache line to evict 903 that can be allocated for the second vertex identifier if there is a miss on both the first and second vertex identifiers.

In the present embodiment this is constrained such that the lines that are selected for eviction are consecutive, in order to simplify the cache line tag updating, as mentioned above. However, other arrangements would be possible.

Whilst various examples described above in the context of two incoming data elements (e.g. two vertices) it will be appreciated that the present embodiment can be extended to more than two lookups, e.g. four, eight, etc., lookups.

The foregoing detailed description has been presented for the purposes of illustration and description. It is not intended to be exhaustive or to limit the technology described herein described herein to the precise form disclosed. Many modifications and variations are possible in the light of the above teaching. The described embodiments were chosen in order to best explain the principles of the technology described herein described herein and its practical applications, to thereby enable others skilled in the art to best utilise the technology described herein described herein, in various embodiments and with various modifications as are suited to the particular use contemplated. It is intended that the scope be defined by the claims appended hereto.

What is claimed is:

1. A method of determining whether data is present in a cache in a data processing system, the cache comprising a plurality of cache lines, each configured to store a portion of data, and each cache line having associated with it an identifier for identifying the data stored in the cache line; the method comprising:

for a group of plural portions of data that will be stored in different cache lines in the cache, each portion of data having an identifier for the portion of data that will match the identifier for a cache line that is storing that portion of data:

comparing a first part of the identifier for a first one of the portions of data in the group with corresponding first parts of the identifiers for cache lines in the cache, to determine whether the first part of the identifier for the first portion of data matches the corresponding first part of an identifier for any cache lines in the cache;

comparing the first part of the identifier for the first one of the portions of data in the group with the corresponding first parts of the identifiers for the remaining portions of data in the group of plural portions of data to determine whether the first part of the identifier for the first one of the portions of data in the group matches the corresponding first part of the identifier for any of the remaining portions of data in the group;

at least when the first part of the identifier for the first one of the portions of data in the group matches the corresponding first part of an identifier for any cache lines in the cache, for at least the first portion of data in the group, and any remaining portion of data in the group whose first part of the identifier matches the first part of the identifier for the first one of the portions of data in the group, comparing a remaining part of the identifier for the portion of data with the corresponding remaining parts of identifiers for cache lines in the cache, to determine whether the remaining part of the identifier for the portion of data matches the corresponding remaining part of an identifier for a cache line in the cache; and determining whether a cache line for any of the portions of data in the group is present in the cache, based on the results of the comparisons.

2. The method of claim 1, comprising for all of the portions of data in the group, irrespective of whether it has been determined that the first part of the identifier for the portion of data in question matches to a cache line in the cache, comparing a remaining part of the identifier for the portion of data with the corresponding remaining parts of identifiers for cache lines in the cache to determine whether the remaining part of the identifier for the portion of data matches the corresponding remaining part of an identifier for a cache line in the cache.

3. The method of claim 1, wherein all of the comparisons are performed simultaneously.

4. The method of claim 1, wherein the first parts of the identifiers comprise a contiguous set of bits from the identifiers.

5. The method of claim 1, wherein the first parts of the identifiers comprise a number of the most significant bits (MSBs) of the identifiers and/or a number of the most significant bits (MSBs) from one or more parameters that make up the identifiers.

6. The method of claim 1, wherein when the first part of the identifier for the first one of the portions of data is determined not to match the first part of the identifier for any cache lines in the cache, a cache miss operation is performed for the first one of the portions of data.

7. The method of claim 1, wherein when the first part of the identifier for the first one of the portions of data matches the corresponding first part of an identifier for one or more cache lines in the cache, for at least the first portion of data in the group, and any remaining portion of data in the group whose first part of the identifier matches the first part of the identifier for the first one of the portions of data in the group, the comparison of the remaining part of the identifier for the portion of data with the corresponding remaining parts of identifiers for cache lines in the cache is performed to determine whether the remaining part of the identifier for the portion of data matches the corresponding remaining part of an identifier for a cache line in the cache, and wherein when it is determined for a portion of data that the remaining part of the identifier for the portion of data does not match the corresponding remaining part of an identifier for any cache lines in the cache, then a cache miss operation is performed for the portion of data.

8. The method of claim 6, wherein the cache miss operation for a portion of data comprises allocating a cache line for the portion of data, and updating the identifier for the allocated cache line to match the corresponding identifier for the portion of data.

9. The method of claim 8, wherein updating the identifier for the allocated cache line to match the corresponding identifier for the portion of data comprises:

updating the first part of the identifier for the cache line to match the corresponding first part of the identifier for the first one of the portions of data in the group; and updating the second part of the identifier for the cache line to match the corresponding second part of the identifier for the portion of data that the cache line has been allocated to.

10. The method of claim 8, wherein the cache line allocation process only allocates plural lines in the cache for receiving portions of data in a group of plural portions of data where plural lookups for the portions of data in the group encountered cache misses where the portions of data that encountered cache misses can be allocated to consecutive lines in the cache.

11. A cache system for a data processor, the cache system comprising:

a cache comprising a plurality of cache lines, each cache line configured to store a portion of data, and each cache line having associated with it an identifier for identifying the data stored in the cache line; and a cache control circuit configured to:

for a group of plural portions of data that will be stored in different cache lines in the cache, each portion of data having an identifier for the portion of data that will match the identifier for a cache line that is storing that portion of data:

compare a first part of the identifier for a first one of the portions of data in the group with corresponding first parts of the identifiers for cache lines in the cache, to determine whether the first part of the identifier for the first portion of data matches the corresponding first part of an identifier for any cache lines in the cache;

compare the first part of the identifier for the first one of the portions of data in the group with the corresponding first parts of the identifiers for the remaining portions of data in the group of plural portions of data to determine whether the first part of the identifier for the first one of the portions of data in the group matches the corresponding first part of the identifier for any of the remaining portions of data in the group;

at least when the first part of the identifier for the first one of the portions of data in the group matches the corresponding first part of an identifier for any cache lines in the cache, for at least the first portion of data in the group, and any remaining portion of data in the group whose first part of the identifier matches the first part of the identifier for the first one of the portions of data in the group, compare a remaining part of the identifier for the portion of data with the corresponding remaining parts of identifiers for cache lines in the cache, to determine whether the remaining part of the identifier for the portion of data matches the corresponding remaining part of an identifier for a cache line in the cache; and determine whether a cache line for any of the portions of data in the group is present in the cache, based on the results of the comparisons.

12. The cache system of claim 11, wherein the cache control circuit comprises a first comparison circuit that is operable to compare a first part of the identifier for one of the portions of data in a group of plural portions of data with the corresponding first parts of the identifiers for all the cache lines in the cache, a second comparison circuit that is operable to compare the first part of the identifier for the first one of the portions of data in the group with the corresponding first parts of the identifiers for the remaining portions of data in the group, and a third comparison circuit that is operable to compare for each of the portions of data in the group, the remaining part of the identifier for that portion of data with the corresponding remaining parts of identifiers for all the cache lines in the cache.

13. The cache system of claim 12, wherein the comparison circuits are configured such that all of the comparisons are performed simultaneously.

14. The cache system of claim 11, wherein the first parts of the identifiers comprise a contiguous set of bits from the identifiers.

15. The cache system of claim 11, wherein the first parts of the identifiers comprise a number of the most significant bits (MSBs) of the identifiers and/or a number of the most significant bits (MSBs) from one or more parameters that make up the identifiers.

16. The cache system of claim 11, wherein when the cache control circuit determines that the first part of the identifier for the first one of the portions of data is determined not to match the first part of the identifier for any cache lines in the cache, a cache miss operation is performed for the first one of the portions of data.

17. The cache system of claim 11, wherein when the cache control circuit determines that the first part of the identifier for the first one of the portions of data matches the corresponding first part of an identifier for one or more cache lines in the cache, for at least the first portion of data in the group, and any remaining portion of data in the group whose first part of the identifier matches the first part of the identifier for the first one of the portions of data in the group, the comparison of the remaining part of the identifier for the portion of data with the corresponding remaining parts of identifiers for cache lines in the cache is performed to determine whether the remaining part of the identifier for the portion of data matches the corresponding remaining part of an identifier for a cache line in the cache, and wherein when it is determined for a portion of data that the remaining part of the identifier for the portion of data does not match the corresponding remaining part of an identifier for any cache lines in the cache, then a cache miss operation is performed for the portion of data.

18. The cache system of claim 16, wherein when it is determined that there is a miss for a portion of data, the cache control circuit is configured to allocate a cache line for the portion of data, and a cache line identifier circuit is configured to update the identifier for the allocated cache line to match the corresponding identifier for the portion of data.

19. The cache system of claim 18, wherein the cache line identifier circuit is configured to update the identifier for the allocated cache line to match the corresponding identifier for the portion of data by:

updating the first part of the identifier for the cache line to match the corresponding first part of the identifier for the first one of the portions of data in the group; and updating the second part of the identifier for the cache line to match the corresponding second part of the identifier for the portion of data that the cache line has been allocated to.

20. The cache system of claim 18, wherein the cache control circuit is configured to only allocate plural lines in the cache for receiving portions of data in a group of plural portions of data where plural lookups for the portions of data in the group encountered cache misses where the portions of data that encountered cache misses can be allocated to consecutive lines in the cache.

21. A non-transitory computer readable storage medium storing computer software code which when executing on a processor performs a method of determining whether data is present in a cache in a data processing system, the cache comprising a plurality of cache lines, each configured to store a portion of data, and each cache line having associated with it an identifier for identifying the data stored in the cache line; the method comprising:

for a group of plural portions of data that will be stored in different cache lines in the cache, each portion of data having an identifier for the portion of data that will match the identifier for a cache line that is storing that portion of data:

comparing a first part of the identifier for a first one of the portions of data in the group with corresponding first parts of the identifiers for cache lines in the cache, to determine whether the first part of the identifier for the first portion of data matches the corresponding first part of an identifier for any cache lines in the cache;

comparing the first part of the identifier for the first one of the portions of data in the group with the corresponding first parts of the identifiers for the remaining portions of data in the group of plural portions of data to determine whether the first part of the identifier for the first one of the portions of data in the group matches the corresponding first part of the identifier for any of the remaining portions of data in the group;

at least when the first part of the identifier for the first one of the portions of data in the group matches the corresponding first part of an identifier for any cache lines in the cache, for at least the first portion of data in the group, and any remaining portion of data in the group whose first part of the identifier matches the first part of the identifier for the first one of the portions of data in the group, comparing a remaining part of the identifier for the portion of data with the corresponding remaining parts of identifiers for cache lines in the cache, to determine whether the remaining part of the identifier for the portion of data matches the corresponding remaining part of an identifier for a cache line in the cache; and determining whether a cache line for any of the portions of data in the group is present in the cache, based on the results of the comparisons.

\* \* \* \* \*